Figure 21:
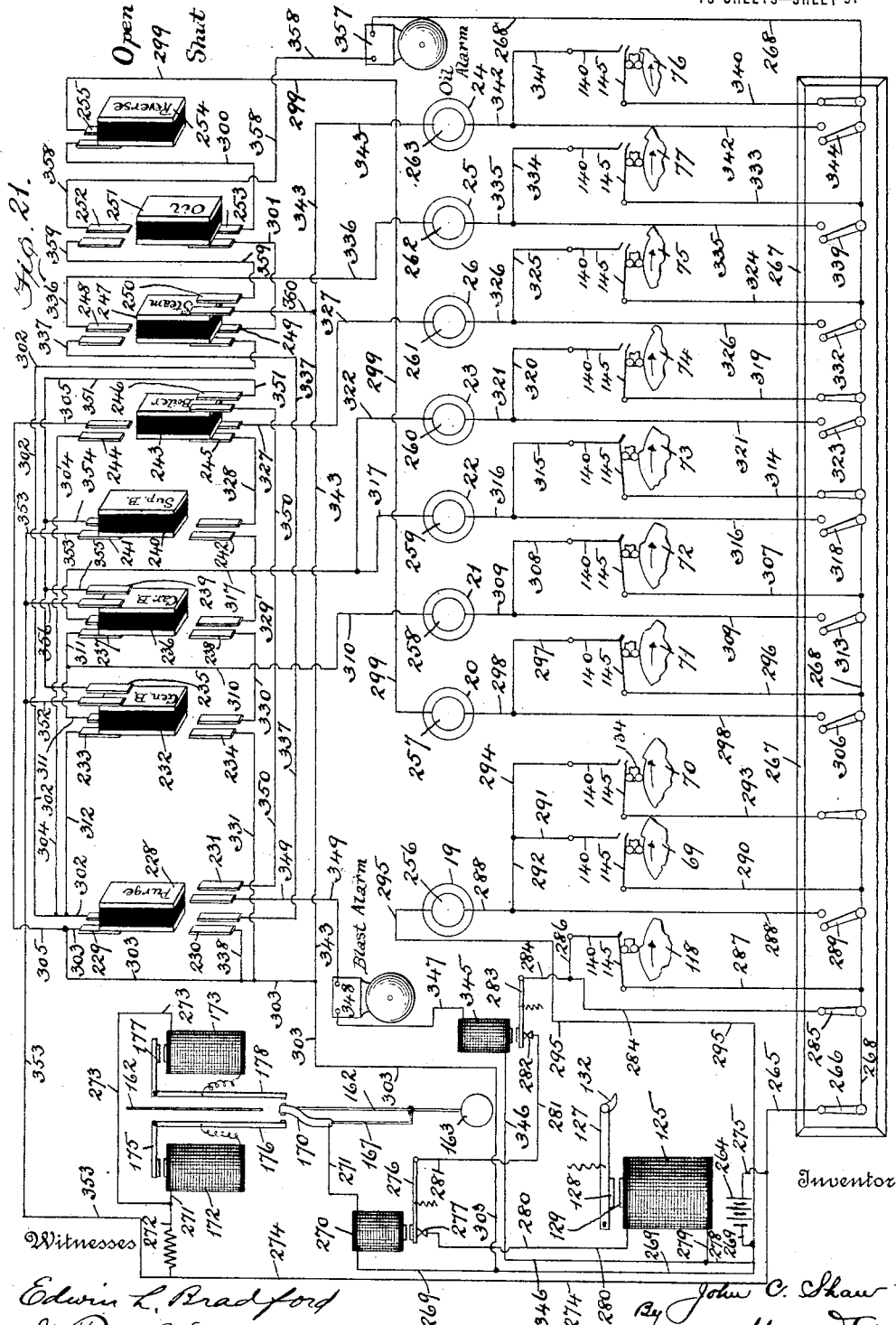

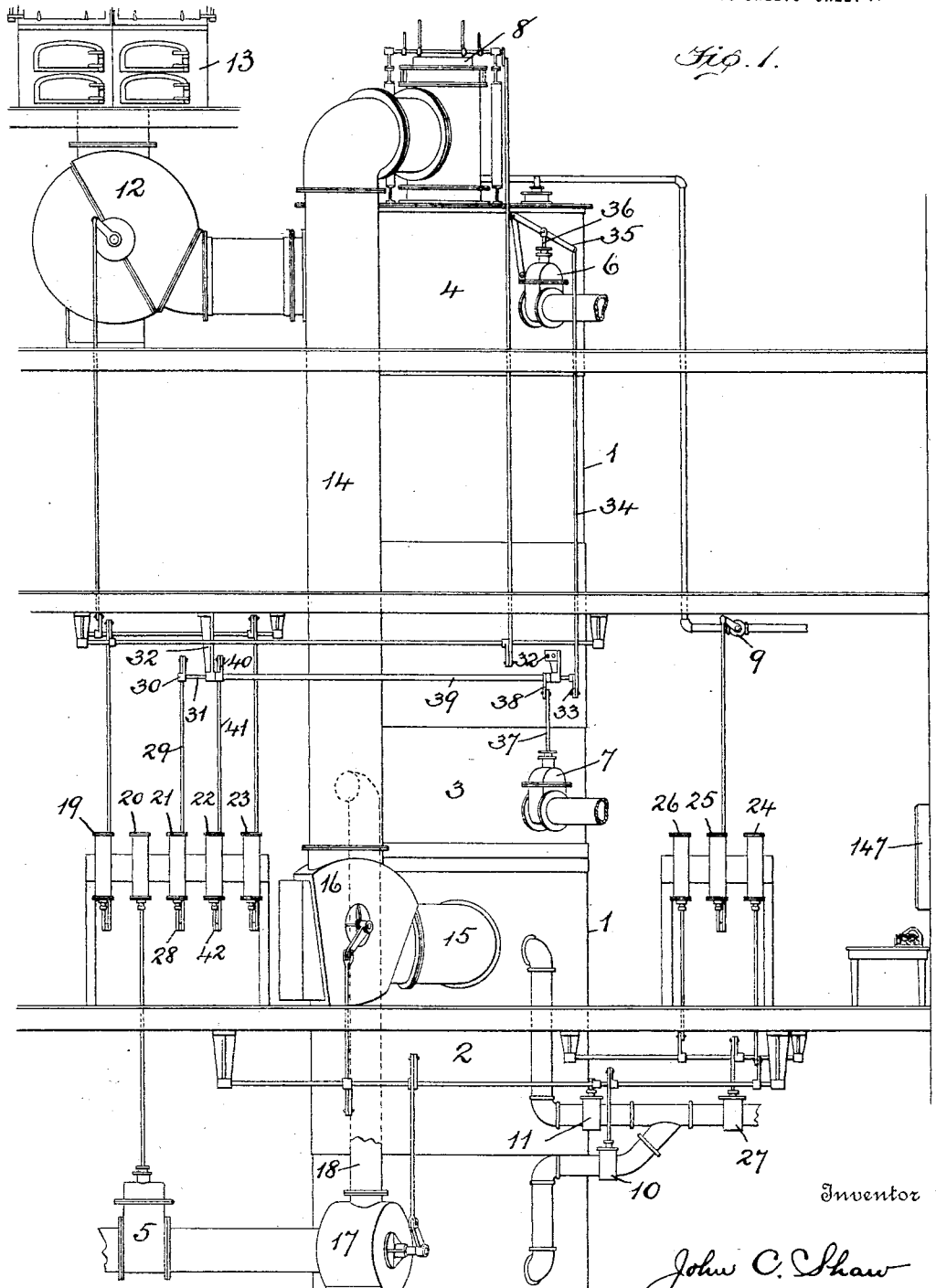

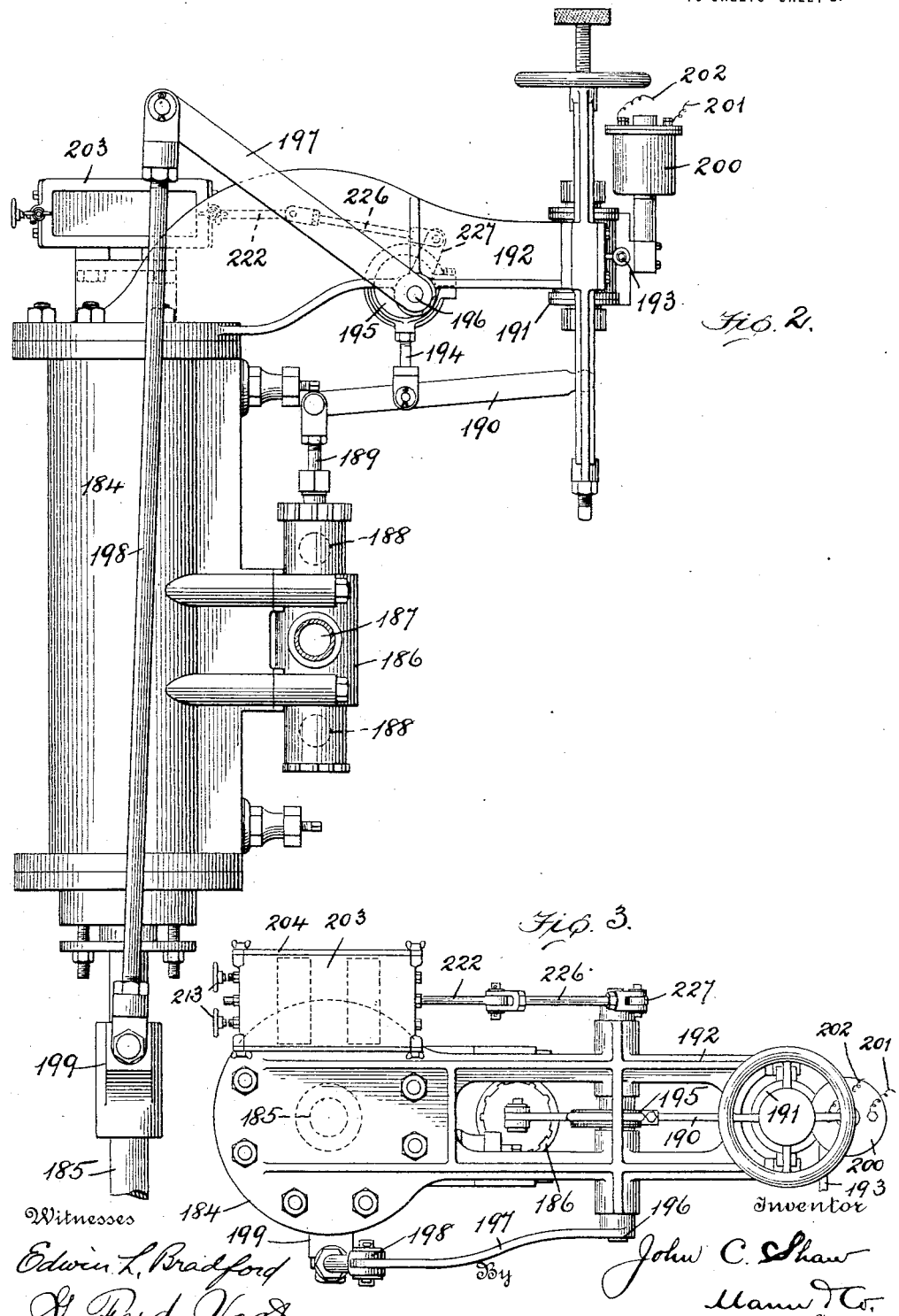

J. C. SHAW.
AUTOMATIC MEANS FOR OPERATING VALVES OF GAS GENERATORS.
APPLICATION FILED JULY 27, 1912.
1,184,692.
Patented May 23, 1916.
10 SHEETS—SHEET 3.
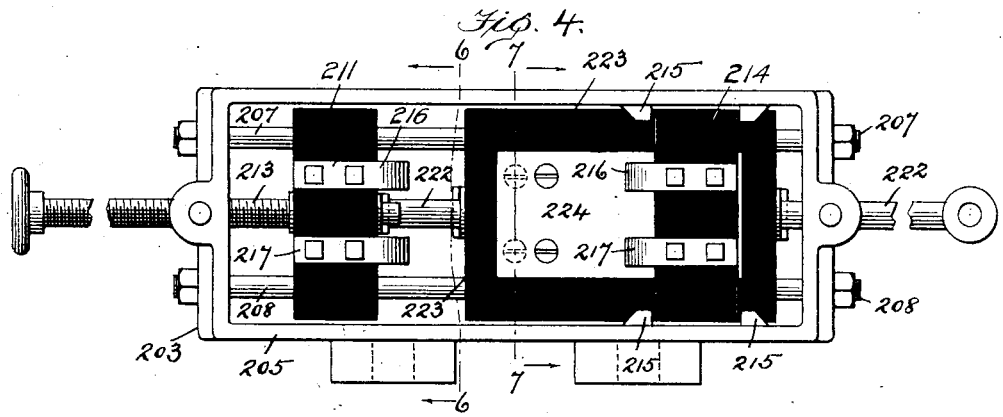
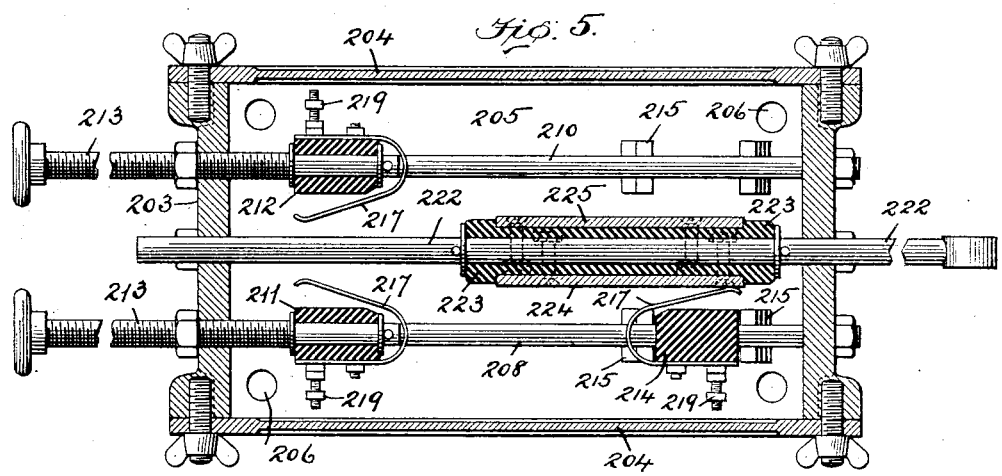
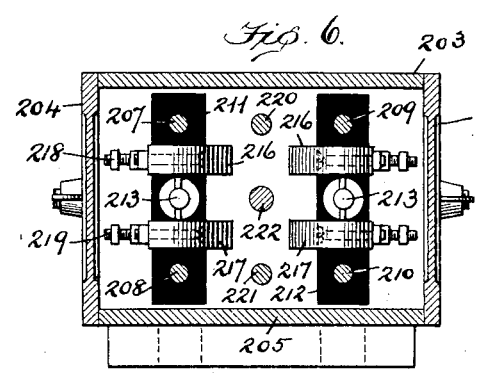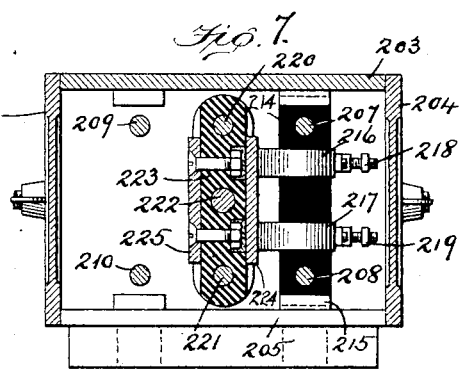

J. C. SHAW.
AUTOMATIC MEANS FOR OPERATING VALVES OF GAS GENERATORS.
APPLICATION FILED JULY 27, 1912.
1,184,692.
Patented May 23, 1916.
10 SHEETS—SHEET 4.
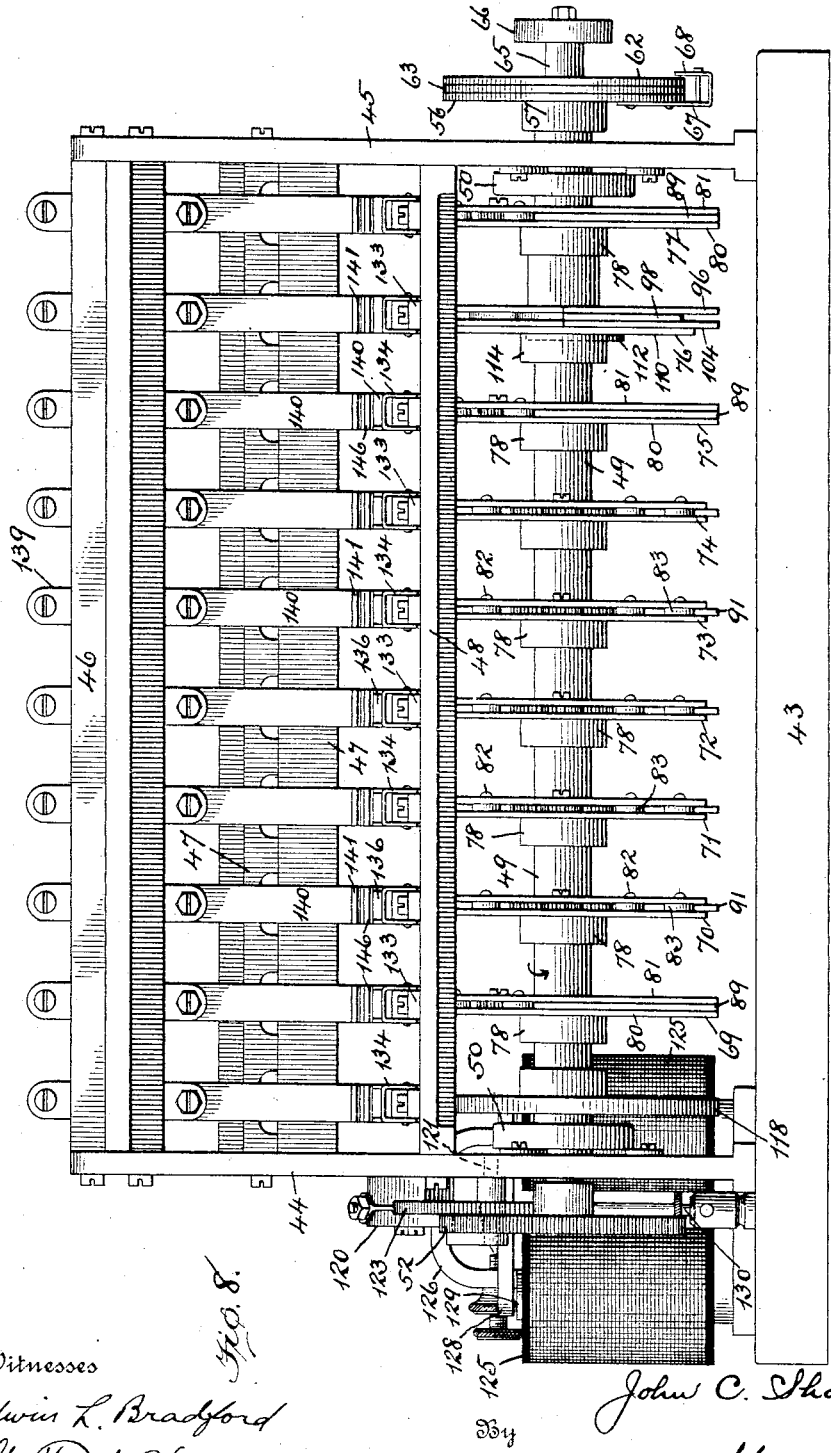

J. C. SHAW.
AUTOMATIC MEANS FOR OPERATING VALVES OF GAS GENERATORS.
APPLICATION FILED JULY 27, 1912.
1,184,692.
Patented May 23, 1916.
10 SHEETS—SHEET 5.
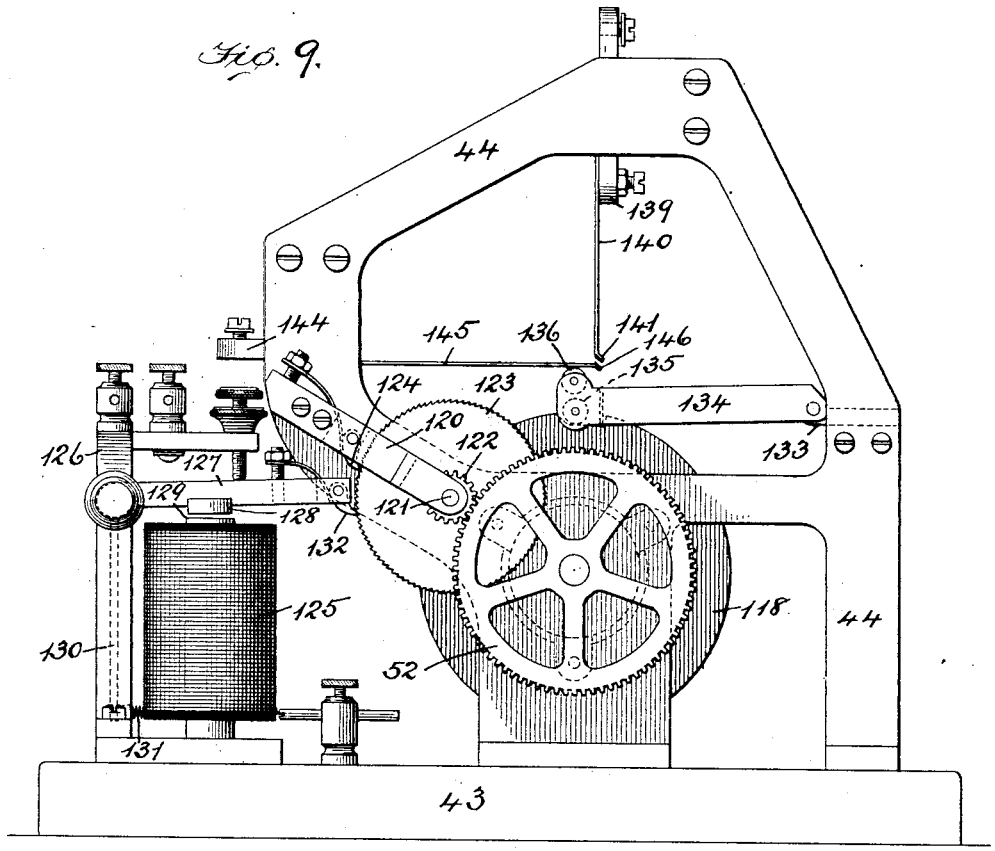
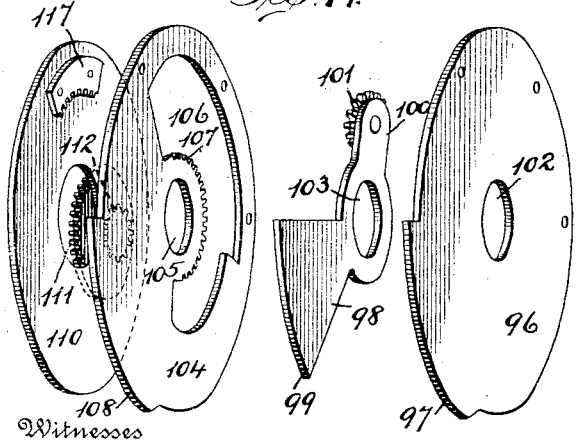
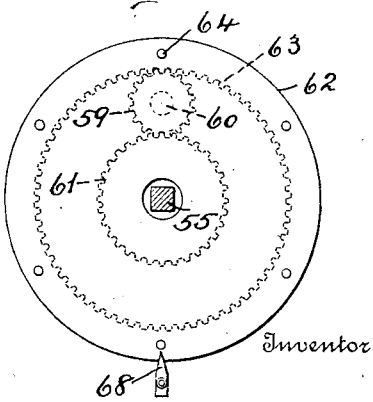
Witnesses
Edwin L. Bradford
G. Ferd. Vogt
Inventor
John C. Shaw
By
Mann & Co.
Attorneys

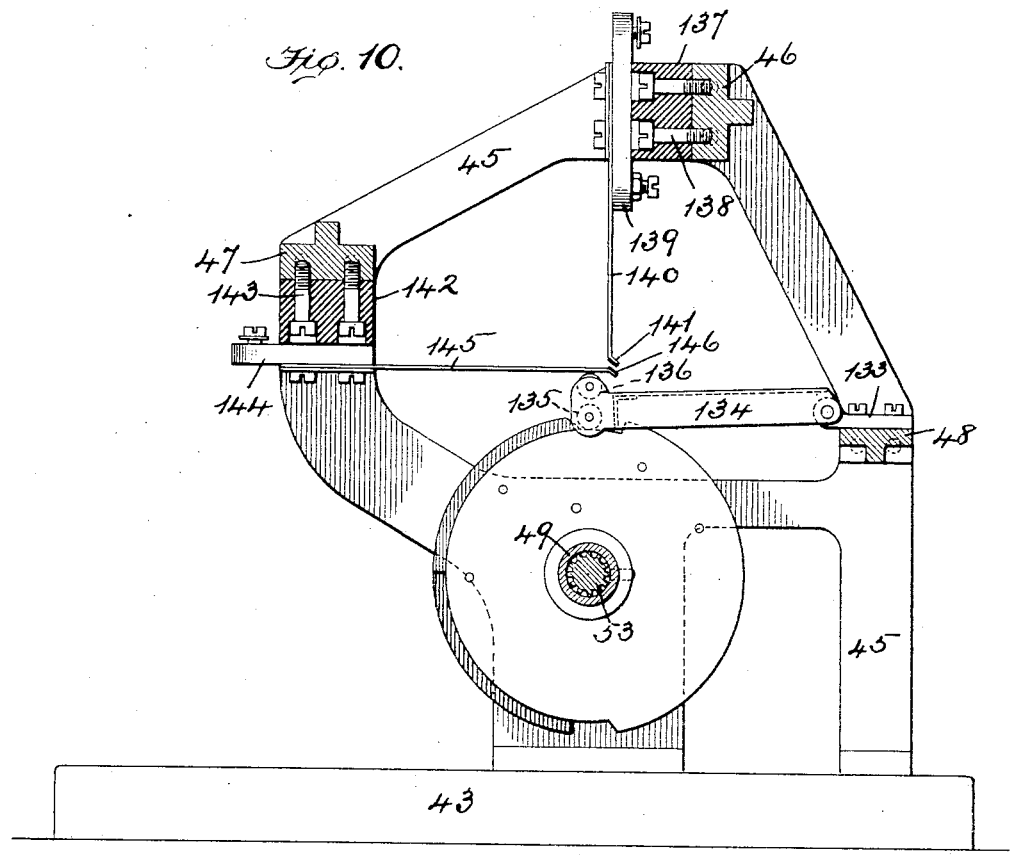
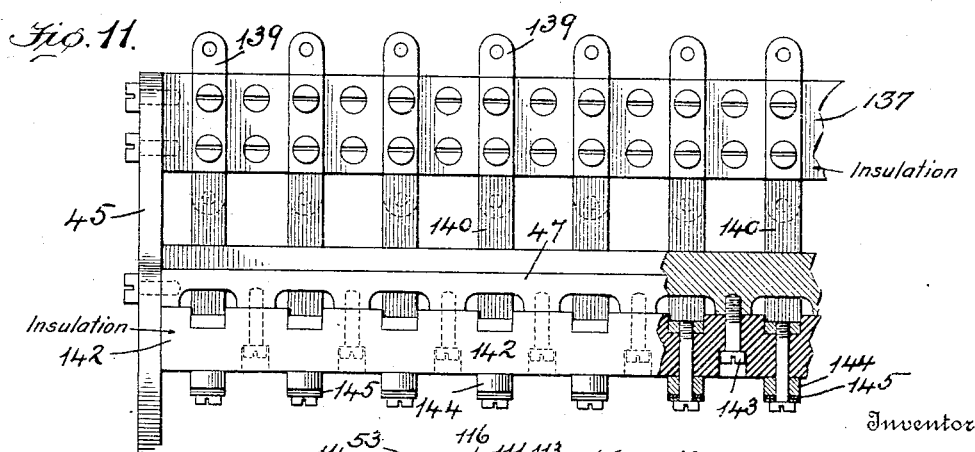

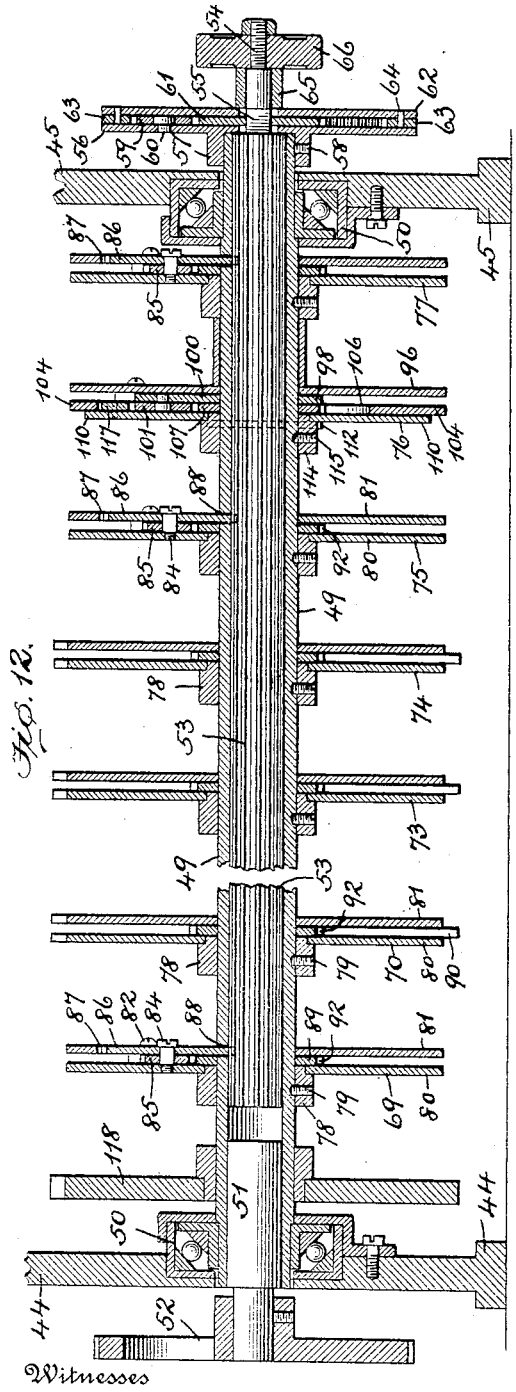

J. C. SHAW.
AUTOMATIC MEANS FOR OPERATING VALVES OF GAS GENERATORS.
APPLICATION FILED JULY 27, 1912.
1,184,692.
Patented May 23, 1916.
10 SHEETS—SHEET 8.
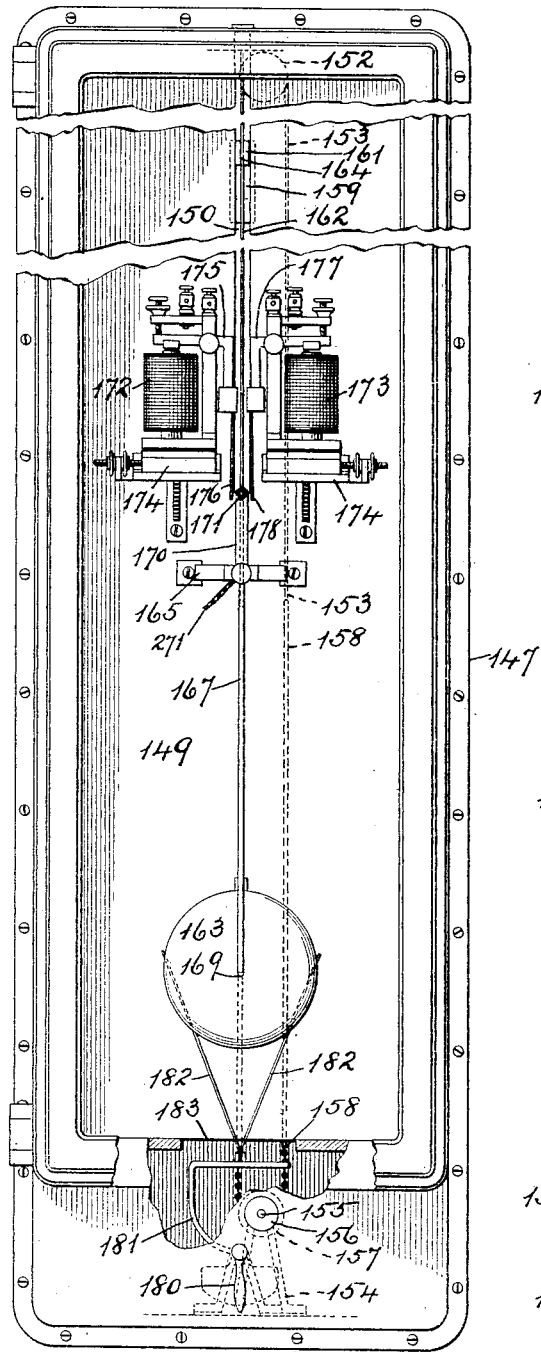
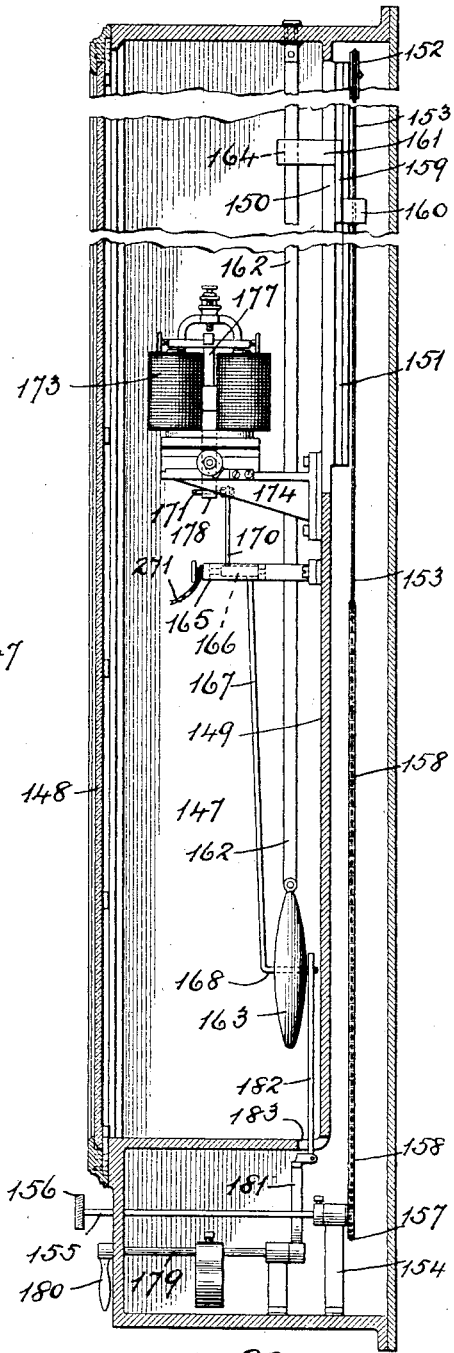
Fig. 19.
Fig. 20.
Witnesses
Edwin L. Bradford
G. Ferd. Vogt
By John C. Shaw
Mann & Co.
Attorneys.

J. C. SHAW.
AUTOMATIC MEANS FOR OPERATING VALVES OF GAS GENERATORS.
APPLICATION FILED JULY 27, 1912.

1,184,692.

Patented May 23, 1916.
10 SHEETS—SHEET 10.

Inventor
John C. Shaw

Witnesses
Edwin L. Bradford
G. Ferd. Vogt

By
Mann & Co.
Attorneys

UNITED STATES PATENT OFFICE.

JOHN C. SHAW, OF ASTORIA, NEW YORK, ASSIGNOR TO THE BARTLETT HAYWARD CO., OF BALTIMORE, MARYLAND, A CORPORATION OF MARYLAND.

AUTOMATIC MEANS FOR OPERATING VALVES OF GAS-GENERATORS.

1,184,692.     Specification of Letters Patent.     Patented May 23, 1916.

Application filed July 27, 1912. Serial No. 711,885.

*To all whom it may concern:*

Be it known that I, JOHN C. SHAW, a citizen of the United States, residing at Astoria, Long Island, in the county of Queens and State of New York, have invented certain new and useful Improvements in Automatic Means for Operating Valves of Gas-Generators, of which the following is a specification.

This invention relates to means for automatically controlling water gas apparatus.

In the manufacture of gas, and particularly water-gas, as it is commercially practised at the present time, a gas generator is employed and the cycle of operation is such as to require the manipulation of a number of valves in proper sequence and at intervals so that considerable skill and constant attention on the part of the operators is required to produce a gas of uniform quality; to avoid errors in the actuation of the valves and losing a run or causing explosions and to produce the best results in quantity and quality of which the generator is capable.

The operation of a water gas set, as it is termed in the trade is divided into two periods, to-wit:—the "blow" and the "run." The "blow" serves to raise the temperature of the fuel bed and checker bricks to produce an incandescent heating surface and the "run" is the actual gas-making period.

Presuming that the generator is charged with fuel the blow is started in the following manner. The stack-valve and upper hydrogen valve being open, the operator will open the generator blast valve to admit air under pressure below the fire. The gases then produced by the combustion pass to the carbureter where they burn on meeting a current of air which has been admitted by the opening of a carbureter blast valve. Any excess of combustible gases may be burned in the superheater by opening the superheater blast valve. The three valves, to-wit: generator blast, carbureter blast and superheater blast, as well as the stack valve and upper hydrogen valve, which were open when the blow period was started, will all remain in the open position for a short period of time, say from two to four minutes, after which the operator must close the valves beginning with the superheater blast valve, then the carbureter blast valve and lastly the generator blast valve, and the first period of the cycle, or the blow period, will have been completed, thus leaving the fuel in the generator in an incandescent condition for the second period of the cycle or the run.

The "run" is the actual gas making period which is started by the operator first opening the up steam valve, to admit steam under the incandescent fuel and immediately after the opening of said up-steam valve, the operator will close the stack valve and then open the oil valve. After a predetermined interval of time between the beginning and the end of the run period, and about the middle of the run period, the operator will close the up-steam valve and then open the down-steam valve to effect a reversal of the gas by passing the steam down through the bed of coals instead of up therethrough. This condition then remains until the end of the run period whereupon the operator will close the oil valve, then close the down-steam valve; reverse the gas and again open the up-steam valve for a few seconds, closing it immediately and finally by opening the stack valve complete the cycle of operation.

From the foregoing statement it will be seen that the complete cycle involves a considerable number of valve opening and closing operations which the gas maker must perform in from every five to eight minutes and as the operations set forth must be carried out within a few seconds of specified times the operator is necessarily under constant strain. Furthermore the operation of the various valves must occur in the proper order or sequence and at proper times intervals as the failure to do so may produce dangerous conditions in or about the generator.

The present invention therefore has for its main object to provide a mechanism or a series of mechanisms to automatically actuate the valves throughout the entire cycle of operation.

Another object of the invention is to provide means to coact with the automatic valve actuating means whereby to interlock the various valves and prevent movement of any valve out of its proper time.

A further object of the invention is to provide means for effecting an adjustment of the time intervals between the actuation of the valves whereby the period between the opening and closing or the closing of one valve and the opening of another valve may be increased or diminished.

Another object is to provide mechanism whereby the blow and run periods may be simultaneously varied,— the prolongation of one period automatically effecting a decrease in the other.

A still further object is to provide hydraulic means for actuating valves and electrical means for controlling the hydraulic actuting means, and another object is to provide a time mechanism to determine the movement of the controlling means.

With these and many other objects and advantages in view, as will more readily appear in the accompanying specification, the drawings herewith, illustrate one form of mechanism for carrying the invention into practical effect, but it is to be understood that the invention is not to be restricted to the mechanism shown.

In the accompanying drawings, Figure 1, illustrates a gas generator to which the various valves and actuating devices are shown connected,—the precise positions of the valves being more or less diagrammatically shown for the purpose of more clearly illustrating the inventive idea involved. Fig. 2, shows a side elevation of one of the hydraulic valve-actuating motors or devices. Fig. 3, illustrates a top plan view of the same. Fig. 4, shows in side elevation one of the interlocking-box contacts with which each hydraulic motor may be provided. Fig. 5, illustrates a sectional plan of the same. Fig. 6, shows a vertical cross-section through the same, the section being taken on the line 6—6 of Fig. 4, and looking in the direction indicated by the dart. Fig. 7, is a similar section taken however on the line 7—7 of the said Fig. 4, and looking in the direction of the dart. Fig. 8, shows a rear elevation of the adjustable cam-timing mechanism. Fig. 9, illustrates an end elevation of the same. Fig. 10, shows a vertical sectional detail through the cam-timing frame and illustrates one of the cams and the pair of coacting contact plates and the actuator which is interposed between the plates and the cam which controls those plates. Fig. 11, illustrates a front elevation of the upper portion of the frame which carried the contacts and cams. Fig. 12, shows a vertical longitudinal section through the tubular cam-shaft pinion therein and cams thereon. Figs. 13, 14 and 15 are details of the three forms of adjustable cams employed on the cam-shaft. Fig. 16, is a cross-sectional detail through the cam shaft and one of the cams thereon,—the section being taken on the line 16—16 of Fig. 15. Fig. 17 shows the cam-parts illustrated in Fig. 15 in a separated condition,—the several parts being shown in perspective and in relative position for assembly. Fig. 18, illustrates in side elevation the circular head for adjusting the cam shaft and cams thereon to vary the circuit-closing period. Figs. 19 and 20 are front and vertical sectional views respectively of the variable timing mechanism. Fig. 21, shows a diagrammatic view of the electric wiring between the timing mechanism, the cams and valve-actuating motors and interlocking contacts, and Figs. 22 to 29 are diagrammatic views of the various interlocking contacts.

Referring particularly to Fig. 1 of the drawings the generator, 1, is shown in a more or less diagrammatic way and the various valves have been positioned with a view of illustrating them rather than for the purpose of showing their preferred or actual positions in practice.

The particular construction of the generator is immaterial to the present invention, but in the present instance the generator proper is designated, 2; the superheater, 3, and the carbureter, 4.

A generator blast valve, 5, is provided to control the passage of air under pressure below the fire; a carbureter blast valve, 6, and a super-heater blast valve, 7, are also provided for their usual and well-known purposes. In addition to the valves mentioned the apparatus also has a stack valve, 8; an oil valve, 9; up-steam and down-steam valves, 10, and, 11, respectively, and in the present arrangement a boiler valve, 12, which is so interposed between a boiler, 13, and the generator as a whole that the waste heat which passes during the blow and would ordinarily be wasted, is utilized to generate steam by passing through the boiler structure, 13, before it is allowed to escape.

A conduit, 14, extends vertically at the side of the generator and its lower end communicates with a branch conduit, 15, which connects with the upper end of the generator proper,—a valve, 16, being interposed between said conduit and branch.

A valve, 17, at the lower end of the generator controls communication between the latter and a conduit, 18, which latter may be made to communicate with the casing of valve, 16, by means of the conduit, 14.

Without going into the details of gas-making it is deemed sufficient to point out briefly that during the blow the generator blast valve, 5, is opened; the carbureter blast, 6, is then opened and the superheater blast, 7, is next opened,—all in comparatively rapid succession. The boiler valve, 12, is next opened and the stack valve, 8, then closed,—this latter valve (8) having been left open at the termination of the previous gas-making or run period. This condition of open valves remains for a period, say from 2 to 4 minutes during which time the blast is conducted through the boiler and utilized to generate steam. Next, the stack valve, 8, is again opened; the boiler valve, 12, then closed and finally the super-heater blast valve, 7; the carbureter blast valve, 6, and the generator blast valve, 5, are closed as rapidly as possible, in the order named, and the "blow" period is terminated.

At the beginning of the "run" or the actual gas making period, it is the practice to open the up-steam valve, 10, to admit steam beneath the fire; the stack valve, 8, is then closed and the oil valve, 9, opened in quick succession, and this condition prevails for about one-half of the run or gas-making period. Then the down-steam valve, 11, is opened to admit steam on the upper side of the fire and the valves, 16, and, 17, are simultaneously operated to shut off conduit, 15, and to allow the gas to pass through valve, 17, and conduit, 18, to conduit, 14, which is termed reversing gas, because the steam now passed down through the fire instead of up through it as just previous, and the up-steam valve, 10, is then closed. This last condition will prevail for the second half of the run or gas-making period. The oil valve, 9, is then closed; up-steam valve, 10, again opened; down-steam valve, 11, closed; valves, 16, and, 17, again reversed to force the gas from beneath the fire; stack valve, 8, again opened and finally the up-steam valve, 10, closed, and the run period thus completed.

It will thus be seen that these numerous valve operations must be carried out during each cycle of the apparatus, in say, from every five to eight minutes and constant attention is required.

In carrying out my invention I employ suitable motor or power devices to effect an actuation of the valves,—each valve being provided with an actuator. The particular form of these motors or valve-actuators is not essential to the present invention, and the same may derive their power, electrically, pneumatically or by hydraulics. In the present instance I show a motor structure of the hydraulic form wherein suitable plunger-rods or pistons are operated to effect an actuation of the particular valve with which each is connected.

By referring to Fig. 1 of the drawings it will be noted that these valve-actuating motors are shown diagrammatically,—the numeral, 19, designating the motor for actuating the stack-valve, 8; 20, the motor for actuating the generator blast valve, 5; 21, that motor which operates the carbureter blast valve, 6; 22, the motor for the super-heater blast valve, 7; 23, the motor which operates the boiler valve, 12; 24, the motor which actuates the up-steam valve, 10, down-steam valve, 11, and gas valve, 16, and, 17, respectively; 25, the motor which actuates the oil valve, 9, and, 26, that motor which cuts off all steam at valve, 27, from both valves, 10, and, 11.

Inasmuch as valves, 10, 11, 16 and 17 are utilized to effect what is termed a reversal of the run, in that at the first part of the run the steam is admitted below the fire and passes up through the same, and during the second part of the run, steam is cut off from beneath the fire but is admitted above the fire and made to pass down through the latter, and the valve, 16, and, 17, are reversed to effect this reversal of the run, all of said valves may be actuated by a single motor, which in this instance is designated, 24.

Thus it will be understood that when the motor, 24, is moved in one direction, one steam valve will be opened and another closed and at the same time one of the valves, 16, or, 17, will be opened and the other closed, and when the motor, 24, is actuated in a reverse direction a reversal of the valve positions will result so that at all times two valves will be opened and two closed.

An entire cut-off of the steam is effected by means of valve, 27, which is actuated by motor, 26.

Suitable rods, shafts and levers are interposed between the various motors and the valves which they actuate respectively to effect the operation of one by the other, and the only ones of these devices to which it is deemed advisable to refer particularly, are the connections between the carbureter blast valve, 6, and its actuating motor, 21, and the super-heater blast valve, 7, and its motor, 22.

It will be noted, by referring to Fig. 1, that a plunger or piston rod, 28, projects from motor, 21, and is connected to a vertical rod, 29, whose upper end is sustained by an arm, 30, on the end of a horizontal shaft, 31. This shaft is sustained in suitable hangers, 32, and carries a second arm, 33, which is pivotally connected to the lower end of a vertical rod, 34. The upper end of this rod, 34, in the present illustration is pivotally attached to one end of a bar, 35, which latter is connected to the stem, 36, of carbureter blast valve, 6. The super-heater blast valve, 7, has a stem, 37, to which one end of an arm, 38, is attached while the other end of the said arm is rigidly connected to a tubular shaft, 39, which slips over and is sustained on the horizontal shaft, 31.

A second arm, 40, also carried on said tubular shaft, 39, is connected to the upper end of a vertical rod, 41, while the lower end of this rod, 41, is connected to the plunger or piston rod, 42, of the motor, 22.

The operation of the respective motors or valve-actuators in their order, is effected through a motor-control mechanism which, in the present instance has the form of a series of circuit closers so that the making or closing of a circuit which controls a motor will effect an operation of that motor.

The motor-control mechanism is illustrated in Figs. 8 to 18 inclusive of the drawings, and particular attention is directed for the present to Figs. 8 to 11, inclusive, wherein, 43, designates a base plate in which a suitable vertical frame is sustained,—said frame comprising vertical end plates, 44, and, 45, and connecting bars, 46, 47, and, 48, which extend horizontally between and connect the said end plates.

A tubular shaft, 49, extends horizontally between and is sustained at its opposite ends in suitable bearing, 50, on the said end plates, 44, and, 45, and at one end said tubular shaft is provided with a stud shaft, 51, which is rigid thereon and whose outer end carries a gear, 52.

A long pinion, 53, extends longitudinally in the tubular shaft, 49, and said pinion has a threaded end, 54, which projects beyond the end of the tubular shaft and is provided with a portion 55, which is angular in cross-section, as shown in Figs. 12 and 18 of the drawings.

Provision is made for rotating the pinion, 53, with respect to the tubular shaft, 49, for adjusting purposes which will presently be described, and by referring to said Figs. 8, 12 and, 18, the adjusting devices will now be described.

A circular disk, 56, has a central annular flange, 57, which fits over the end of the tubular shaft, 49, and said disk seats against the end of said tubular shaft and is held rigidly thereon by means of a set screw, 58. A pinion, 59, is secured to one side of the disk, 56, by means of a suitable pin, 60, and a gear, 61, has an angular central opening which conforms in shape to and engages the angular portion, 55, on the projecting end of the internal pinion, 53, so as to couple the gear and the said internal pinion and compel them to turn in unison. An adjusting disk-plate, 62, has position at the outer side of the pinion, 59, and gear, 61, and said plate carries a circular rack, 63, which is secured thereto by suitable pins, 64, and which engages the pinion, 59, as clearly shown in broken lines in Fig. 18, of the drawings. It is believed to be obvious from the foregoing explanation that if disk, 62, is turned by hand, rack, 63, will also turn, and pinion 59, will rotate so as to turn, gear, 61. As gear, 61, is fast with respect to the internal pinion, 53, its rotation or adjustment with respect to the tubular shaft, 49, will cause a similar rotation or adjustment of the internal pinion with respect to said tubular shaft. To lock the internal pinion, 53, and tubular shaft in their adjusted positions, a sleeve, 65, encircles the outer end of the internal pinion and a circular thumb nut, 66, engages the threaded portion, 54, of said pinion-end so as to bind the sleeve against the outer face of the disk-plate, 62. To make the adjustment, it will be seen that nut, 66, will first be loosened, then disk-plate, 62, turned which will move the rack, pinion and gear to effect a proper revolution or partial revolution of the internal pinion, 53. A suitable bracket, 67, may be provided on the disk, 56, with a pointer, 68, projecting over the surface of the disk plate, 62, whereby to enable the amount of rotation of one plate with respect to the other to be readily determined.

The tubular shaft, 49, is provided with a series of cams, 69, 70, 71, 72, 73, 74, 75, 76, and, 77, respectively,—there being one cam for each valve-actuating motor employed in the apparatus. In Fig. 12 of the drawing two cams, 71, and, 72, are omitted because that figure is made on an enlarged scale to better illustrate the vertical section which it shows,—the omitted cams however are the same in construction as cams, 70, 73, and, 74. Each of the cams, 69, to 77, inclusive is made rigid on the tubular shaft, 49, by means of a hub or collar, 78, and a set screw, 79, so that all of those cams revolve together with the tubular shaft. All of the said cams with the exception of the cam, 76, are alike in construction, and a description of one will supply to all except said cam, 76.

Each cam comprises two spaced-apart disks, 80, and, 81, respectively which are secured together by means of screws, 82, and are held in a spaced-apart condition by means of spacer-washers, 83, shown in Fig. 8. Each disk, 80, is provided with a bearing screw or pin, 84, which extends horizontally across the space between the two disks and pivotally sustains a pinion, 85, and a gear, 86, which are side-by-side and rigid with respect to each other. The disk, 81, is provided with a circular opening, 87, in which the gear, 86, has position. By referring to Figs. 12 and 13 it will be noted that the tubular shaft, 49, is provided with circumferential slots, 88, and that said slot communicates with the circular opening, 87, so that the gear, 86, may project circumferentially into the slot, 88, and engage the internal pinion, 53, in the tubular shaft, 49.

Between the disks, 80, and, 81, each cam has a segment cam-plate, 89, whose outer circumferential edge, 90, has a cam face, 91. Each cam plate, 89 has a central opening through which the tubular shaft, 49, extends so as to form a bearing on which the cam plate may be rotated, and around the central opening each plate has a segment-rack, 92, which meshes with the pinion, 85.

From the foregoing explanations it is to be understood that when the internal pinion, 53, is rotated within and with respect to the tubular shaft, 49, it will rotate gear, 86, and at the same time turn pinion, 85, and the latter, by meshing with the segment cam-plate, 89, will move the latter between the disks, 80, and, 81, so that its cam face, 91, will be projected from between the cam faces, 93, of the disks as shown in Fig. 13, or may be retracted and moved back or partially back between the faces, 93. As the faces, 93, of the disks and the face, 91, of the segment plate from the working faces of the cam, it is obvious that by projecting the segment plate from between the disks said working time of the cam will be lengthened and by retracting it the working time shortened.

It is to be understood that the cams, 69, to, 77, (not including cam, 76) do not all have the same set or position on the tubular shaft, 49, but may be placed thereon to work in time to suit the purpose for which they are intended. In the present instance however, it happens that cams, 69, 75, and, 77, are adjusted to practically the same positions while cams, 70, 71, 72, 73, and, 74, are all positioned substantially alike on said tubular shaft, 49.

As an example of the operation of the cams suppose some of them be positioned on the shaft, 49, and the segment plates of such cams having position entirely between the working faces, 93, of the disks, 80, and, 81, as shown in broken lines in Fig. 14. To extend the working period and correspondingly lessen the inactive period, the internal pinion, 53, will be rotated in the direction of the dart at the center of Fig. 14, gear, 86, will be rotated in a reverse direction, as indicated by the dart; pinion, 85, which turns in the same direction with gear, 86, will engage rack, 92, and turn the segment plate, 89, so as to project its working face, 91, from between the disks, 80, and, 81, which face 91, is flush with the working faces, 93, of said disks. Obviously the further the segment plate is projected to that same extent will the working time of the cam be prolonged, as will be seen by the circumferential broken lines, 94, in said Fig. 14, and at the same time the inactive period of the cam will be lessened. In all cases however the period of inaction plus the period of working will equal the cycle of the cam and the prolongation of one period will effect a correspondingly decrease in the other period. The adjustment therefore of all the cams is simultaneously made by the rotation of adjusting disk-plate, 62, on the outer end of shaft, 49, and pinion, 53, and the devices are locked in the adjusted positions by means of nut, 66.

By referring to Figs. 8, 12, 15, 16 and 17 the construction of cam, 76, will be described. This cam is employed to control the action of the motor which actuates the reverse valves, 16, and, 17, and also the up-steam and down-steam valves, 10, and, 11, respectively all of which are actuated in the present instance by the one motor 24. This cam, 76, comprises an outer side disk, 96, which has a circumferential cam face, 97; a segment plate, 98, with a cam face, 99, and also with an arm or extensions, 100, to which a pinion, 101, is rotatably mounted. The disk 96, has a central opening, 102, through which the tubular shaft, 49, extends and the segment plate, 98, has a central hole, 103, for a similar purpose so that when on the shaft, the segment plate may have position at the inner side of the disk, 96, and with its face, 99, flush with the face, 97, of the disk. Next to the segment plate, this cam also has a disk plate, 104, with a central opening, 105, for the passage of shaft, 49, and also has a semi-circular slot, 106, with a segmental rack, 107, around therein and around the opening, 105. This disk plate, 104, also has a cam face, 108, of the same shape and length as the face, 97, on disk, 96, and which is separated from said face 97, by the interposed segment plate, 98. These three plates 96, 98, and, 104, are mounted on the shaft, 49, in the order re cited and the pinion, 101, will have position in the slot, 106, of plate, 104. Screws, 109, extend through the plate, 96 then through spacing washers and enter the plate, 104, but do not engage the interposed plate, 98, which is loose on the shaft between said plates, 96, and, 104, and is capable of movement between the said plates as will presently appear. A fourth plate or disk, 110, also forms a part of cam, 76, and this plate has a central opening through which shaft, 49, extends and carries a gear, 111, on its outer side and a pinion, 112, on its inner side. Both gear, 111, and pinion, 112, are mounted rigidly with respect to each other but are rotatable on a pin, 113, so as to revolve together. This fourth plate, 110, is of less diameter than plates, 104, or, 96, and is carried on a collar, 114, which latter is secured rigidly on the shaft, 49, by means of a set screw, 115, as shown in Fig. 12. By referring to Fig. 16, of the drawings, it will be noted that the tubular shaft, 49, is provided with a circumferential slot, 116, and that the gear, 111, projects through said slot and engages the long pinion, 53, on the interior of said tubular shaft. By means of this construction when the long pinion, 53, in the tubular shaft is rotated by hand, which only occurs when adjusting the cams, the gear, 111, and pinion, 112, will be rotated and as gear, 112, meshes with the segment rack 107, on plate, 104 the latter will be rotated on the tubular shaft, 49. As plates, 104, and, 96, are secured together by the screws, 109, the rotation of, 104, will effect a corresponding rotation of plate 96.

Between the plates, 104, and, 96, as above explained, is the segment plate, 98, which latter is also loose on the tubular shaft, and a rotation of this plate is effected by means of the pinion, 101, one side of which also meshes with the segment rack, 107, and whose diametrically opposite side meshes with a stationary rack-plate, 117, which is rigidly secured on and is stationary with the plate, 110. This rack plate, 117, by engaging the pinion, 101, will require the latter to advance in a circular path when it is revolved by the segment rack, 107, thus causing the cam face, 99, of the segment plate, 98, to be projected from between the cam faces, 97, and, 108, of plates, 96, and, 104, and thereby coact with those faces to increase length of the contact period of the cam, as will presently be explained.

From the foregoing explanation it is to be understood that all of the cams, 69, to, 77, may be adjusted simultaneously to lengthen or shorten the contact period, by a manipulation of the long pinion, 53, in the tubular shaft, 49, in the manner hereinbefore set forth. In addition to these cams the tubular shaft carries a cam, 118, which will be hereinafter referred to as a stop cam and by means of which the entire apparatus may be shut down at the end of a cycle, as will hereinafter be set forth.

The stub shaft, 51, at the end of tubular shaft, 49, (see Fig. 12, of the drawings) extends through the end plate, 44, of the frame, and the outer end of said stub shaft carries a gear, 52. A bracket bearing, 120, is sustained at the side of plate, 44, and a shaft, 121, extends horizontally between said bearing and plate, and carries a pinion, 122, which meshes with the gear, 52, and also carries a ratchet wheel, 123. The ratchet wheel and pinion are rigid on the shaft, 121, and are turned together or at the same time. A spring-pressed pawl, 124, allows the ratchet wheel to turn in one direction but prevents its rotation in a reverse direction.

A pair of electro-magnets, 125, are mounted above the base, 43, and a suitable frame, 126, pivotally carries an armature bar 127, with an armature, 128, on the under side thereof which projects over the ends of the electro-magnets and in close proximity to the cores, 129, of the latter. A suitable rod, 130, depends from the armature bar, 127, and a spring, 131, is attached to said rod whereby to yieldingly draw the lower end thereof in such a direction as will normally hold the armature bar and armature away from the magnet cores. The free end of the armature bar terminates adjacent to the periphery of the ratchet wheel, 123, and is provided with a pawl, 132, which contacts with the ratchet wheel so as to impart a partial rotation to said wheel each time the magnets are energized and the armature and armature-bar are drawn down. The energization of these electro-magnets is effected intermittently and at regular intervals, through a pendulum or equivalent mechanism which will presently be described and each time the magnets are energized the armature bar will move the pawl, 132, so as to partially rotate the ratchet wheel, pinion, gear, 52, and finally the cam shaft, 49, and cams thereon. By this means the cams are intermittently rotated at each energization of the electro-magnets, 125. Upon each deënergization of the magnets, the spring, 131, shown in Fig. 9, will raise the armature bar and pawl, 132, so as to return the pawl where it can take a fresh bite on the ratchet wheel.

By referring to Figs. 8 and 10 of the drawings it will be noted that the bar, 48, which extends horizontally between and connects the end plates, 44, and, 45, is provided with a plurality of hinge plates, 133. In the present instance ten of these hinge plates are provided on the bar, 48,—the plates being spaced apart and there being one plate for each cam on the tubular shaft, 49. Each hinge plate pivotally sustains one end of a cam bar, 134,—the bars extending from the plates and projecting over the circumference of the cams so that each cam will be provided with a cam bar. The forward or free end of each cam-bar, 134, is preferably provided with two rollers, 135, and, 136, respectively. The roller 135, rests upon the circumference or working face of the cam whereby to obviate friction and wear, and the roller, 136, is provided for a similar purpose as will presently more fully appear.

From the foregoing explanation it will be understood that as the cams revolve, the rollers, 135, and the free ends of the cam bars, 134, will be raised and lowered according to the faces on the cams. It is this raising and lowering of the cam-bars that is utilized to close and open the circuits which control the operation of the motors or valve actuators,—the connections for the circuits being made and broken by means of suitable contact bars which will now be described, reference being made particularly to Fig. 10, of the drawing.

The upper bar, 46, which connects the end plates, 44, and, 45, is provided with a strip of insulation, 137, which latter is rigidly secured thereto by means of screws, 138.

A plurality of binding posts, 139, are secured to the insulation so as to provide one binding post for each cam and each cam-bar, 134. A contact bar, 140, is secured to each post, 139, and each bar depends from the post toward the bar, 134, below it and in the present instance, the lower end of each contact bar has a lateral bend, 141. The horizontal bar, 47, which also extends between and connects the end plates, 44, and, 45, also has an insulating bar, 142, which latter is held in place by the screws, 143, and a plurality of contact posts, 144, are secured in a spaced-apart condition along said insulating bar and each of these posts sustains a horizontal contact bar, 145, which extends over the cam which controls it and has its free end resting upon the roller, 136, on the cam-bar, 134. The free end of each bar, 145, also has a lateral bend, 146, which is normally spaced from, but is in close proximity to the bent end, 141, of the depending bar, 140, with which it coacts. These bent ends, 141, and, 146, are preferably provided with platinum contacts.

By means of the arrangement of contact bars, 140, and, 145, over the respective cam-bars, 134, the upward movement of the latter by means of the respective cams, will cause the contact bar, 145, to be raised into connection with the contact bar, 140, so as to establish a circuit through those bars as long as said bars are held in contact by the working faces of the cams beneath them.

It has heretofore been explained that the cam shaft is actuated by intermittent movements of the armature-bar, 127, through corresponding energizations of the electro-magnets, 125. The means employed to effect this is shown in Figs. 19 and 20 of the drawings to which reference will now be made.

A casing, 147, is located at any convenient place about the gas plant and it is preferable that the same and also the motor controlling device or cam mechanism be in close proximity, as shown diagrammatically in Fig. 1, although this is not essential. The casing preferably has a glass door, 148, at the front in order that the mechanism on the interior may be seen without the necessity of opening the door. A partition, 149, extends vertically in the case adjacent to the rear wall thereof and said partition is provided with a central vertical slot, 150, with suitable guide bars, 151, extending vertically at opposite sides of the said slot. A grooved pulley, 152, is mounted on a bracket at the rear of the partition and at the upper end of the slot, 150, around which a flexible cord, chain or belt, 153, extends. At the lower end of the case, and on the interior thereof, is a bearing bracket, 154, through which a horizontal shaft, 155, extends. The outer end of this shaft is provided with a knurled wheel or other suitable device, 156, by means of which the shaft may be rotated, or partially rotated, with the fingers. The inner end of the shaft carries a sprocket wheel, 157, around which a sprocket chain, 158, passes. This chain extends up at the rear of the partition and its two ends are attached to the ends of the cord, chain or belt 153, which has been referred to as passing around the pulley, 152, so that the said cord, chain or belt together with the sprocket chain will form an endless flexible band between the upper pulley and the lower sprocket which may be made to travel by operating the wheel, 156.

A movable head, 159, is slidably carried between the guide bars, 151, and has a rearwardly-extending lug, 160, which is securely fastened to one stretch of the flexible band or cord, 153, so that by moving the cord, as above described, the said head may be raised or lowered for adjusting purposes, presently to be more fully explained. An arm, 161, projects forwardly from the head 159, and extends through the vertical slot, 150, so as to project on the outer side of the partition. A flexible metal tape or strap, 162, is secured at the upper end of the case and depends therefrom and the lower end of said tape carries a pendulum weight, 163. The tape or strap, 162, passes through a vertical slit, 164, in the arm, 161, of head, 159, so that the beat of the pendulum may be varied by raising or lowering the arm on the strap.

Above the pendulum weight and on the interior of the case there is a horizontal bracket, 165, which latter projects from and is sustained by the partition, 149. This bracket sustains a short oscillating bar, 166, which latter has a horizontal position and a rod, 167, depends from said oscillating bar and has a rearward bend, 168, at its lower end which passes through a central opening, 169, in the pendulum weight, 163. The oscillating bar, 166, also has a comparatively short upwardly-projecting arm, 170, with an outwardly-extending horizontal pin, 171, at its upper end.

Above the oscillating bar, 166, are two sets of electro-magnets, 172, and, 173, respectively each of which is mounted on a suitable bracket, 174, which latter are carried by the partition, 149. The electro-magnets, 172, have an armature, 175, from which a spring contact plate, 176, depends and has position at one side of the pin, 171, while the magnets, 173, have an armature, 177, which carries a depending spring contact plate, 178, which latter plate has position at the other side of the said pin, 171. Normally when the magnets, 172, and 173, are deënergized and the rod, 167, and arm, 170, of the oscillating bar, 166, are in a straight up-and-down or vertical position, neither of the spring contact plates, 176, or, 178, is in contact with the pin, 171, but upon the swinging of the pendulum the pin, 171, will contact with the first say plate 176, and thereby close a circuit through the electromagnets, 172, which will actuate the armature, 175, and thereby aid in swinging the pendulum back toward the other contact plate, 178, where a similar operation takes place. This intermittent contact and actuation of armatures, 175, and, 177, and the contact by pin, 171, with plates, 176, and, 178, results in the intermittent energization of the electro-magnets, 125, to impart a rotary motion to the cam shaft, 49, which will hereinafter be more fully set forth in connection with the explanation of the circuits.

To start the pendulum a rock-shaft, 179, is provided at the bottom of the pendulum case which shaft has an operating arm, 180, on its outer end and on its inner end the said shaft carries an upwardly-curved bar, 181, from which diverging actuating arms, 182, project. These arms project through a slot, 183, in the partition and extend up at the rear of the pendulum weight, 163, where they may be rocked one way or another to start the pendulum by contacting with the inner end of the bend, 168, on the lower end of rod, 167.

The foregoing explanations have set forth the arrangement of valve devices in the gas apparatus which are to be automatically actuated; has explained the pendulum timing mechanism for intermittently actuating the time cams, and has described the cam devices and the manner of adjusting the same. The construction therefore next to be briefly explained will be the motor mechanisms which are connected directly, or through levers and shafts, with the valves whereby the latter are actuated. This mechanism is illustrated in Figs. 2 and 3 of the drawings to which attention is now directed.

In so far as the present invention is concerned the motor mechanism may be very different from that shown, it only being necessary that some suitable means of sufficient power be provided which will be set in motion to move the valve or valves to which they are connected through the action of the cams and which will be restored to normal position in time with the cam action.

In the present instance the motor proper (shown in Fig. 1 in a diagrammatic manner and designated thereon as 19 to 26 inclusive) has a cylinder, 184, from one end of which a plunger or piston rod, 185, extends, —a piston, not shown, being provided in the cylinder and carrying the said plunger or piston rod. A suitable valve casing, 186, is provided at one side of the cylinder in which a piston valve, also not shown, is carried. A water inlet, 187, is provided in this valve casing and water outlet ports, 188, serve to carry off the water after it has served its purpose in the cylinder, 184, to actuate the piston in the latter. It will thus be understood that the piston and the piston rod, 185, of cylinder, 184, is actuated, in the present instance hydraulically through the actuation of the valve in the casing, 186. The valve in casing, 186, has a stem, 189, which projects on the exterior thereof and by means of which the valve on the interior is operated to admit water to one or the other side of the piston in cylinder, 184, and to allow water from the other side of said piston to pass out of the cylinder, 184, and escape through one or the other of ports, 188.

A rock lever, 190, has one end pivotally connected to the upper end of valve stem, 189, and the other end of said lever extends laterally to and terminates beneath a stem of an air-actuated piston valve (also not shown) which is carried in a valve casing, 191, on the outer end of a horizontal bracket, 192. An air-inlet pipe, 193, enters the casing, 191, and admits air thereto for the actuation of the valve therein so as to effect a movement of the rock lever. The rock lever, 190, is pivotally sustained between its ends from the lower pendant end of an eccentric bar, 194, which is carried by an eccentric, 195, which latter is mounted on a horizontal shaft, 196. This eccentric shaft, 196, is connected at one end by a lever, 197, which extends laterally therefrom and a rod, 198, has its lower end pivotally connected to a horizontal bracket, 199, which is rigidly secured on piston rod, 185, and its upper end is pivotally connected to lever, 197, so that as the piston rod is actuated, the eccentric shaft, 196, will be rocked.

The passage of air through pipe, 193, into casing, 191, is controlled in the present instance by means of a solenoid, 200, whose casing is carried on the side of the cylinder, 191,—the wires, 201, and, 202, of which are shown in Fig. 2.

From the foregoing explanation it is to be understood that the actuation of solenoid, 200, through the closing of a pair of contacts, 140, and, 145, by means of one of the cams on cam shaft, 49, will cause air under pressure to enter casing, 191; actuate the valve therein and by the movement of said valve move lever, 190; stem, 189, and the valve in casing, 186, so that water may be admitted to cylinder, 184, and actuate the piston and the piston-rod, 185, therein. The piston rod, 185, it will be understood, by referring to the diagrammatic view shown in Fig. 1, will either connect direct, or through levers and shafts, with the valve or valves in the gas apparatus which that particular rod is to actuate. It is also to be understood that there will be a plurality of cylinders like that designated, 184, and that there may even be one of such cylinders for each valve in the gas apparatus.

Each cylinder rod, or motor, however, is set in operation through its solenoid and the latter is actuated by the circuit formed by movement of the particular cam on the cam shaft which is to control the particular valve.

By pivotally sustaining the rock lever, 190, from the depending eccentric bar, 194, a slow movement is imparted to the valve stem, 189, after its initial movement, for after said stem moves its valve to start the admission of water into cylinder, 184, and piston rod, 185, begins its downward or outward movement, the rod, 198, and lever, 197, will be actuated by said piston, 185, and the eccentric shaft, 196, will be rotated so as to operate the eccentric, 195, and cause the eccentric bar, 194, to move downwardly, thus lowering the pivot point of rock lever, 190, as the valve stem, 189, lowers and thereby causing an inlet of water through casing, 186, into cylinder, 184, and a corresponding movement of piston or plunger rod, 185, and the valve of the gas generating apparatus with which said plunger rod, 185, is connected.

Each gas-valve actuating motor is provided with an interlocking mechanism, the preferred mechanical construction of which will now be explained, reference being made to Figs. 2 to 7 inclusive of the drawings.

On top of cylinder, 184, there is a bracket which carries a box or case, 203,—the latter being provided with detachable covers, 204, at opposite sides thereof and also having a bottom, 205, which is provided with wire-entrance openings, 206, for the wires from the solenoids of the valve-actuating motors to enter, as will presently be more fully explained.

The box shown in Figs. 4 to 7, is provided with four longitudinally-extending supporting rods, 207, and, 208, and, 209, and, 210. The rods, 207—208, extend horizontally between and are supported by the opposite end walls of the box, and these two rods are located in the same vertical plane, and to one side of the central line through the box. The rods, 209 and 210, have a similar relation but are located at the other side of the vertical center of the box. These rods, as their name implies serve as supports to sustain adjustable contact blocks, 211, and 212, respectively,—the block, 211, being sustained by rods, 207 and 208, and the block, 212, being sustained by the rods, 209 and 210. In order to provide for adjusting the positions of the blocks on the rods, each block is secured to the inner end of a screw rod, 213, which latter extends through an end wall of the box with which it has threaded engagement so that by turning the screw rod the contact block attached at the inner end of that rod may be moved along the two supporting rods toward one end or the other as desired.

It will be noted that in the box shown in Figs. 4 to 7, the rods, 207 and 208, carry a second contact block, 214, and that this latter block is held against movement on the rods by means of stop lugs, 215, which project from the top and bottom walls of the box. In some instances, as shown in the diagrammatic views of the boxes in Figs. 22 to 29, inclusive a variation of the contact blocks is made and it is therefore to be understood that the particular arrangement of contacts shown in the detail views of Figs. 4 to 7 is not adhered to in carrying out the inventive idea, although the construction of devices shown may be the same. Each contact block is provided with two contact plates, 216, and, 217, respectively, which are insulated from each other and are provided with binding posts, 218 and, 219, for the connection of the wires.

It will thus be understood that in the form of box now described there are four contact plates at one side and two contact plates on the other side of the vertical center of the box and that the contact plates are arranged in pairs,—the two normally insulated plates on each block constituting a pair. In view of this arrangement of contact plates, provision must be made to effect a closing of the circuit between the two plates of any pair and the means for doing this will now be explained.

The box has two horizontally-extending guide rods, 220, and, 221, respectively which are arranged in a central vertical line in the box and between the two sets of rods, 207, and, 208, on the one side, and the rods, 209, and, 210, on the other side, as clearly shown in Figs. 6 and 7. Between the two guide rods, and also extending horizontally through the box there is a reciprocable stem, 222. The guide rods, 220, and, 221, sustain a central contact block, 223, through which latter the reciprocable stem, 222, extends and is rigidly attached. This block, 223, carries at one side a contact plate, 224, and at the other side is provided with another contact plate, 225. The plates, 224, and, 225, are of sufficient width to engage both of the spaced contact plates, 216, and, 217, whenever the block, 223, is moved to a position to force said plates, between those contacts.

In the position shown in Figs. 4, 5 and 7, it will be noted that the block, 223, is so located that plate, 224, will close the circuit between the pair of control plates, 216, and, 217, on the block, 214. In like manner, if the block, 223, were moved to the opposite end of the box the plate, 224, would close the circuit between the contacts, 216, and 217, on block, 211, while plate, 225, at the same time would close the circuit between the pair of contacts, 216, and, 217, on the block, 212. It will therefore be noted that the movable block, 223, and its plates, 224, and, 225, control the circuits which lead to and from the box and that said block and plates are actuated by the reciprocable stem, 222, which extends through the end wall of the box and is connected as will now be explained.

By now referring to Figs. 2 and 3 of the drawings it will be noted that the stem, 222, which projects from the interlock box is connected by one end of a link bar, 226, and that the other end of said bar is pivotally attached to the free end of an arm, 227, which is carried on the horizontal shaft, 196, which is oscillated by the movement of the bar, 197, rod, 198, bracket, 199, and the stem, 185, of the piston in cylinder, 184. Thus it will be seen that when the piston in cylinder, 184, begins to travel, shaft, 196, will be oscillated and stem, 222, will be moved in one direction or the other according to the direction the piston in cylinder, 184, is traveling.

In view of the fact that the movement of any motor, which being connected to one or more valves in a gas generator is the equivalent of the movement of such valve or valves and also in view of the fact that upon such movement of a valve or valves the contacts in the interlock box, 203, are actuated, it may readily be seen that when one valve or a plurality of connected valves, is or are actuated the contacts may be shifted so as to make or break a circuit with other motors and thereby prevent or cause the movement of other valves, and in this way effect an interlocking or produce such conditions in and about the generator as will maintain proper working and safety conditions. In carrying out this automatic interlocking of the various valves each valve-actuating motor or mechanism will be provided with an interlocking device,—each device being separately and diagrammatically shown in Figs. 22 to 29 inclusive and also shown in the wiring diagram of Fig. 21, to which attention is now directed.

Figure 22:
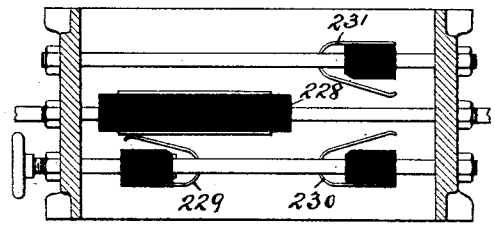
Figure 26:
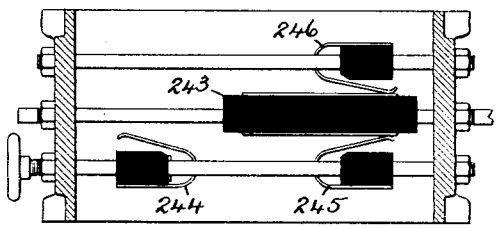
Figure 23:
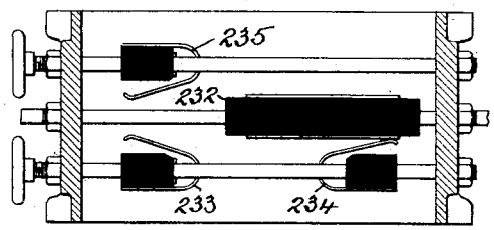
Figure 27:
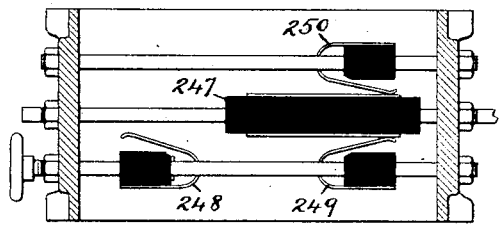
Figure 24:
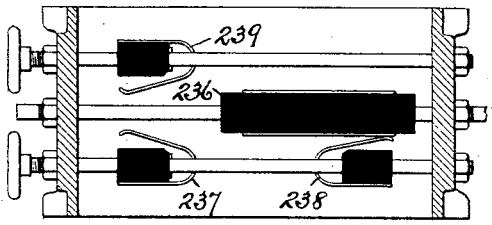
Figure 28:
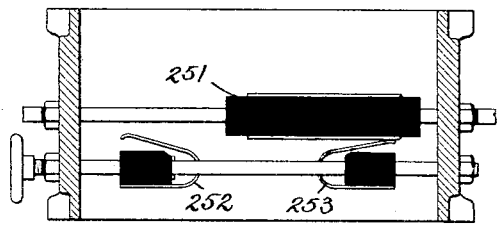
Figure 25:
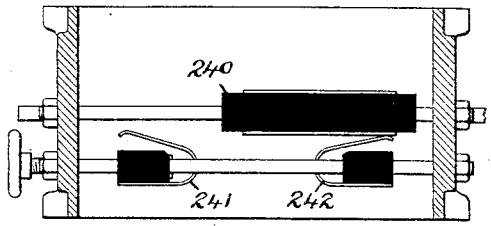

Fig. 22 illustrates that interlocking device which is employed in connection with the purge or stack valve designated, 8, in the diagrammatic view of the generator shown in Fig. 1. The valve, 8, is shown in the present instance as operatively connected with motor, 19, and the interlocking device for said motor, 19, is provided with a movable circuit closer, 228, and three sets or pairs of stationary contact plates, 229, 230, and 231, respectively. The generator blast valve, 5, is actuated in the present instance by motor, 20, and has an interlocking device with a movable circuit closer, 232, and three sets of stationary contact plates, 233, 234, and 235, respectively as seen in Fig. 23. The carbureter blast valve, 6, is shown in the present instance as being operated by motor, 21, and has an interlocking device with a movable circuit closer, 236, and three pairs or sets of stationary contact plates, 237, 238, and, 239, respectively as shown in Fig. 24. Superheater blast valve, 7, in the present instance is illustrated as operatively connected with motor, 22, and the interlocking device for this motor has a movable circuit closer, 240, and two sets or pairs of contact plates, 241, and, 242, respectively, as shown in Fig. 25. The boiler valve, 12, is shown connected with motor, 23, and the interlocking device for this valve and motor, as shown in Figs. 21 and 26, has a movable circuit closer, 243, and three sets or pairs of contact plates, 244, 245, and, 246, respectively. Steam valve, 27, also has a separate motor, 26, in the present instance and the interlocking device for this motor, shown in Fig. 27, has a movable circuit closer, 247, and three sets or pairs of stationary contact plates, 248, 249, and, 250, respectively. The oil valve, 9, is actuated in the present instance by means of motor, 25, and the interlock actuated by this motor is shown in Fig. 28, as having a movable circuit closer, 251, and two sets or pairs of stationary contacts, 252, and, 253, respectively with one or the other of which sets or pairs of contacts said circuit closer may be made to contact.

Figure 29:
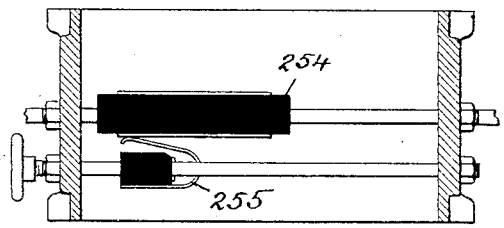

In the arrangement of apparatus shown in the present example the one motor, 24, is so connected as to actuate valves, 16, and, 17, to effect a reversal of the gas and to also actuate the up and down steam valves, 10, and, 11, and in connection with this motor, 24, there is provided an interlocking device having a movable circuit closer, 254, and a single pair or set of stationary contacts, 255, as shown in Fig. 29, of the drawings.

It is to be understood that the particular arrangement of interlocks and motors is entirely immaterial and is merely illustrative of a way of carrying out the inventive idea, it being desired to provide an automatic valve actuating mechanism which will also automatically effect the interlocking to prevent the opening of some valves when other valves are open.

As hereinbefore explained the several motors or valve actuators, 184, are each set in motion, in the present instance through the action of a solenoid or equivalent device, and in order to better explain the wiring and connections between said solenoids and the cam-actuated contacts, the several solenoids are diagrammatically illustrated in the wiring diagram in Fig. 21 of the drawings wherein, 256, designates the solenoid for the purge-valve motor, 19; 257, the solenoid for the generator blast-valve motor, 20; 258, the solenoid for the carbureter blast-valve motor, 21; 259, the solenoid for the superheater blast-valve motor, 22; 260, the solenoid for the motor, 23, which actuates the boiler valve; 261, the solenoid which controls the motor, 26, which actuates the steam-supply valve, 27; 262, that solenoid which controls motor, 25, that actuates oil valve, 9, and, 263, the solenoid which controls motor, 24, whose function is to operate reverse valves, 16, and, 17, and the up and down steam valves, 10, and, 11, respectively. Also in this wiring diagram the several cams and the contact plates, 140, and, 145, which coact with those cams are shown together with the wire connections to the several solenoids and between the solenoids, the several interlocking devices and the current supply, as will now be explained.

The current-supply is designated, 264, and one pole thereof is connected by a wire, 265, which latter leads to one point of a switch, 266, in a suitably-constructed box or panel board, 267. A main line wire, 268, extends through the panel board and has connection with the switch, 266, so that the latter may control all circuits that pass through the said panel board. This panel board is preferably located within convenient reach of an attendant so in case anything should become disengaged in the apparatus a manipulation of the switch may readily be made by hand if necessary, to avoid loss or damage.

It has heretofore been explained that the operation of the motors which actuate the valves, is effected at intervals through a motor controlling cam mechanism and that the latter is operated through a timing mechanism, both of which mechanism have been explained in detail.

In the wiring diagram of Fig. 21, it will be noted that the electro-magnets, 172, and, 173, are alternately energized and deënergized by the movement of the pendulum, 163, through the swinging arm, 170. To effect the energization of these magnets the circuit is as follows: from battery or current supply, 264, by wire, 269, through relay magnet, 270; then by wire, 271, to arm, 170, and when the latter swings into contact with either arm, 176, or, 178, making momentary contact with one or the other of said arms and thereby momentarily energizing one or the other of the electro-magnets 172, or, 173, for a purpose presently to be explained, and from magnet, 172, the circuit will be by wire, 271, to wire, 272, but from magnet, 173, the circuit would be by wire, 273, to wire, 272, finally returning by wire, 274, and, 275, to battery, 264. It will thus be understood that the timing mechanism will operate continuously irrespective of all other mechanisms or devices in the apparatus.

The movement of the pendulum is continued after it has once been started, by the spring arms, 176, and, 178, which latter are actuated each time the armature which carries it is attracted by its magnet, consequently after the arm, 170, makes contact with either of arms, 176, or, 178, that arm (either, 176, or, 178,) will swing laterally and start the swinging arm, 170, on its return movement.

It will also be seen that each time the circuit above described is completed, the relay magnet, 270, will be energized and that armature, 276, will be attracted upon each energization of the said relay magnet and thus move away from a contact point, 277, with which it is in normal contact.

The armature, 276, and contact point, 277, are both included in a circuit which intermittently energizes electro-magnets, 125, to effect a step-by-step rotation of the cam shaft, 49, which is hereinbefore referred to as a motor control mechanism, and which rotates the cams so as to effect a closing or hinging together of the contacts, 140, and, 145, to establish circuits and cause an operation of the respective valve actuating motors.

The circuit to effect the energization of the electro-magnets, 125, and thus actuate armature, 127, to turn the cams, is from battery or current-supply, 264, by wire, 269, to wires, 278, and 279, electro-magnet, 125, then from said magnet by wire, 280, to contact point, 277, through armature, 276 to and by wire, 281, to contact, 282; armature, 283; wire, 284, to switch, 285, and then by wire, 268, back through switch, 266; wire, 265, to wire, 275, to battery. It will thus be seen that the electro-magnets, 125, of the motor control mechanism are intermittently energized and deënergized by the intermittent energization and deënergization of relay magnet, 270, through the action of the pendulum, because each time the relay magnet, 270, is energized it will attract armature, 276, and draw said armature away from contact point, 277, thus momentarily interrupting the circuit from battery 254, through electro-magnet, 125. When however relay magnet, 270, is deënergized the armature, 276, will close the circuit from battery, 264, through magnets, 125, and by energizing the latter attract armature, 127, whose pawl, 132, will operate to partially rotate the cam shaft, 49. Thus it will be understood that during each return swing of the pendulum, 163, the cam shaft will be actuated through the energization of electro magnets, 125.

Under certain conditions, or if for special reasons it should be found expedient to entirely stop the movement of the cam-shaft at the end of the cycle of operation by cutting off or interrupting the circuit through the electro-magnets, 125, the switch bar, 285, may be moved to the cut-off position without immediately breaking the circuit because in such an instance the circuit would then be completed by the current passing through wire, 286, contact, 140, to contact, 145, and then by wire, 287, to main line wire, 268, thus passing around the switch, 285. This condition would then remain until at the end of the cycle of operation whereupon the stop cam, 118, would allow the contacts, 140, and, 145, to separate whereupon the circuit through magnets, 125, would be automatically broken and further movement of all the cams stopped. The stoppage of the cam shaft however does not interfere or cause the timing pendulum to stop because of the separate circuit for the latter as already explained. If on the other hand it is desired to immediately stop further movement of the cam shaft, without waiting for the end of a cycle, it may be done by simply moving switch, 266.

Before entering upon an explanation of the circuits for the various valve-actuating motors, it is deemed advisable to point out, that the motor which controls the purge valve normally has position to keep the purge valve open, and that the said motor only operates to close the said valve when an electric circuit is established and maintained. The reverse is true of all other valve motors and the latter all actuate to open the valves by the completion of a circuit; therefore all of the latter valves normally remain closed. This arrangement is very desirable for the reason that the purge valve will serve as a safety valve, and can only be closed when the circuits are in proper condition, but will immediately open if the circuits fail. So also with the other valves, by keeping the air, steam and oil valves normally closed and opening them only by the closing of electric circuits, the latter must be in proper order to admit air, steam or oil. These two features therefore provide an element of safety in and about the generator that has never heretofore been attained.

Referring again to Fig. 21 of the drawings it will be seen that the solenoid, 256, of the purge-valve motor, 19, is connected by a wire, 288, with a switch, 189,—the latter in turn connecting with the main line wire, 268, but in the present instance being shown open to prevent current passing direct to said solenoid. This switch, 289, is provided for the purpose of enabling an attendant to close a circuit from the main line wire, 268, through the purge-valve motor solenoid at any time without waiting for the cam mechanism to close such a circuit, as will presently be explained, but normally said switch will be open. This solenoid 256, also has wire connections whereby it will be actuated automatically through the movement of cams, 69, and, 70, which operate the contact bars, 145, to bring them into contact with bars, 140. These circuits include wire, 290, 291, 292, and, 288, which will form a connection from main line wire, 268, to one side of the solenoid or wires, 293, 294, 292, and, 288, to the solenoid from main line wire,—it all depending on the position of cam, 69, or cam, 70, either of which may close the circuit through contacts, 145, and, 140. From the other side of solenoid, 256, a wire, 295, leads back to wire, 269, and then to battery, 264. It will thus be understood that normally the purge valve is open and during such time no current is passing through the solenoid of the motor which actuates that purge valve, but that to close the purge valve automatically a circuit will be formed through the solenoid which will start from battery, 264, by wires, 275, 265; switch, 266, main line wire, 268, wire, 290, or, 293, then through contacts, 145, to, 140, by either wire, 291, or, 294, to wires, 292, and, 288, to the solenoid, then return to the battery by wires, 295, and, 269.

In the diagram shown in Fig. 21, the purge valve motor is deemed to be in position so that the purge valve is open, consequently the interlock contact, 228, which is actuated by the purge valve motor is shown in the open position and is closing the circuit across the gap between contact plates, 229, for a purpose which will presently be explained.

The next mechanism in order, shown in the diagram in Fig. 21, is that for the generator blast valve which is actuated by motor, 20, and solenoid, 257. The solenoid in this instance is deemed to be in the actuated position because the cam, 71, has effected a closure of contacts, 145, and, 140, and formed a connection from main line wire, 268, by wires, 296, 297, and, 298, to the said solenoid, 257. Inasmuch as the solenoid, 257, has been actuated to operate motor, 20, and open blast valve, 5, the interlock device, 232, of said motor is shown in the operated or open position to close the gap between contact plates, 233, and also close the gap between contact plates, 235. From the solenoid, 257, of this blast valve motor, 20, the circuit back to the battery is completed by wire, 299, to contact plates, 255, which are closed by interlock, 254, then by wire, 300, to contact plates, 253, which are closed by the interlock, 251; then by wire, 301, to contact plates, 249, which latter are closed by interlock, 247; thence by wire, 302, to purge-valve interlock contacts, 229,—the latter being closed by interlock, 228, and finally by wire, 303, to wire, 269, back to battery, 264. By retracing this circuit for the generator blast it will be seen that in order to operate the generator blast valve motor, 20, it is necessary that the stack valve be open, (or as will presently be explained the boiler valve, 12, must be open) to allow the blast to escape and that at the same time oil and steam valves must be closed, because if either of the latter is open the interlock, 251, or, 247, would have a position that would cause a break in the generator solenoid circuit,—the break occurring at either contacts, 253, or at contacts, 249, or at both of said contacts, consequently such a break in the generator solenoid circuit would prevent that solenoid from operating and the generator valve motor could not operate. If on the other hand a boiler, such as, 13, is utilized so the waste heat of the blast may be utilized to generate steam, the purge or stack valve may be closed, thus moving interlock, 228, from contact plates, 229, and the generator blast may still operate because at such time the boiler interlock, 243, would be moved to close the gap between contact plates, 244, and the generator solenoid circuit would then be changed so as to include wire, 302, then by wire, 304, back to the contact plates, 244, then by wire, 305, to wires, 303, and, 269, back to battery, 264. Thus it will be seen that only when either purge valve, 8, or boiler valve, 12, is open so as to vent the generator, can the generator blast valve, 5, be opened, and if either oil or steam is opened the generator blast must remain closed. In connection with this generator blast it will be noted that wire, 298, which connects the wire, 297, from the cam contacts with the solenoid, 257, also extends to a switch, 306, which may be operated to directly connect said solenoid with line wire, 268, without going through the contacts which cam, 71, alone can operate. By this means it is possible for the attendant to move the switch and operate the generator blast motor.

Next in order is the carbureter blast-valve motor, 21, and the solenoid, 258, which actuates this motor, and it will be noted that the operation of this solenoid is effected by the cam, 72,—the circuit being from main line wire, 268, through wire, 307, to contacts, 145, and, 140; then by wire, 308, to wire, 309, to the solenoid, 258; then from the solenoid by wires, 310, and, 311, then through the interlock contacts, 233, of the generator blast interlock and by wires, 312, and, 302, to the purge interlock contacts, 229, and finally by wires, 303, and, 269, back to battery, 264. In case the purge valve is closed and boiler valve open the circuit for this carbureter blast valve solenoid will be completed through the boiler interlock by switching to wires, 302, and, 304, thus going back to boiler contacts, 244, and then by wires, 305, 303, and, 269, to battery. It will thus be seen that the carbureter blast can only operate in case either the purge valve or the boiler valve is open. In the case of this carbureter blast it will also be noted that the wire, 309, to the solenoid, 258, extends to a switch, 313, by which the circuit can be closed irrespective of the cam, 72. The superheater blast-valve motor, 22, and its solenoid, 259, are automatically controlled by cam, 73, a wire, 314, forming a connection between main line wire, 268, and cam contact, 145, and wires, 315, and, 316, connecting the other contact, 140, with the solenoid, 259. From the solenoid, 259, the circuit is completed by wire, 317, to and through interlock contacts, 237, of the carbureter blast, then by wire, 311, to and through interlock contacts, 233, of the generator blast; then by wires, 312, and, 302, to and through interlock contacts, 229, of the purge valve interlock and finally by wires, 303, and, 269, back to the battery, 264. In this case the purge valve might be closed but boiler valve open whereupon the circuit would shift from wire, 312, to, 304, then through boiler interlock contacts, 244, and by wires, 305, 303, and 269, back to battery. Thus in the case of the superheater blast either purge or boiler valve must be open or superheater blast cannot open. The wire, 316, of this superheater blast circuit may also be connected with main line wire, 268, by a switch, 318, so as to be operated independently of cam, 73.

In the operation of the gas generator the purge boiler, generator blast, carbureter blast and superheater blast valves, are all utilized in that part of the cycle of operation which has hereinbefore been referred to as the "blow period" and during the "blow" neither steam nor oil is used consequently if either of these valves (steam or coil) is open, their interlocks will be in the open position, thus breaking connection between contacts, 249, or 253, and with either of those connections broken the generator blast cannot operate. The carbureter blast cannot operate because of the break in the generator interlock contacts, 233, and if the carbureter is not operated neither can the superheater blast operate because of the break in the carbureter interlock contacts, 237. Thus the oil and steam are interlocks for the blast valves and must be closed or there can be no blast.

In the case of the boiler-valve motor, 23, and the solenoid, 260, which actuates it, it will be noted that the operation of this solenoid is controlled by the cam, 74, which moves contact, 145, against contact, 140, and allows current to flow from main line wire 268, by wire, 319, to contact, 145, and by wires, 320, and 321, to the solenoid, 260. From the solenoid, 260, the return circuit includes wires, 322, 317, interlock contacts, 237, wire, 311, interlock contacts, 233; wires, 312, and 302; interlock contacts, 229, and wires, 303, and, 269, back to battery, 264. While this circuit is utilized to open the boiler valve, it is not used in its entirety to keep the boiler valve open, because in practice, the opening of the boiler valve is for the purpose of utilizing the waste heat that would otherwise pass through the purge or stack valve, by passing it through the boiler and generating steam and then allowing it to escape into a stack. For this reason after the boiler is opened the stack or purge valve is closed, and when the purge closes, the purge interlocks will move from plates, 299, and break the circuit whereupon the boiler circuit will simultaneously shift from wires 312, to, 302, to wire, 304, then through the boiler interlock contacts, 244, and by wire, 305, to wires, 303, and, 269, back to battery. In this boiler circuit the wire, 231, extends to a switch, 323, which may be moved to connect with line wire, 268, and thus enable the boiler valve to be actuated independently of the cam, 74.

Next in order is the steam valve motor, 26, and its solenoid, 261, which are automatically controlled by cam, 75. The circuit for this solenoid is formed from line wire, 268, by wire, 324, to contact, 145, and from contact, 140, by wires, 325, and, 326, to the solenoid. From the solenoid the circuit can only be closed by wire, 327, which connects with the boiler contacts, 245,—the boiler valve being closed; then by wire, 328, to superheater contacts, 242,—the superheater valve also being closed; then by wire, 329, to carbureter contacts, 238,—the carbureter valve being closed; then by wire, 330, to generator contacts, 234,—the generator valve being closed; then by wires, 331, 303, and, 269, back to battery 264. It will thus be seen that the steam valve solenoid, 261, cannot be operated unless the boiler valve and all of the blast valves are closed. The wire, 326, of the steam valve solenoid circuit extends to a switch, 332, upon the closing of which current from line wire, 268, may be sent direct to the solenoid without depending on the cam, 75. In the case of the oil valve motor, 25, and its solenoid, 262, which latter is automatically controlled by cam, 77, the circuit to the solenoid is formed by wire, 333, from line wire, 268, to and through contacts, 145, and, 140, when the latter are closed by the cam, 77; then by wires, 334, and, 335, to the solenoid, 262. From the said solenoid the return circuit is by wire, 336, to and through steam valve interlock contacts, 248,—the interlock, 247, at that time being in the open position because the steam valve itself is open; then by wire, 337, to the interlock contact plates, 230, of the purge valve, which latter valve must be closed because gas is now being made, and finally by wires, 338, 303, and, 269, back to the battery, 264. It will thus be seen that before the oil valve can operate to open, the steam valve must be open and the purge valve closed. The wire, 335, of the solenoid, 262, connects with a switch, 339, by which current from line wire, 268, may be sent direct to the said solenoid without depending on the cam, 77.

The next and final motor circuit to be discussed is that which actuates the motor, 24, which operates the reverse valves, 16, and, 17, and which is controlled by the solenoid, 263. The circuit for this solenoid is formed from main line wire, 268, through wire, 340, to contact, 145, which latter is actuated by cam, 76, and brought against contact, 140; then by wires, 341, and, 342, to the solenoid, 263. The return circuit from this solenoid 263, is by wire, 343, to wires, 303, and, 269, back to battery, 264. The wire, 342, of solenoid, 263, extends to a switch, 344, which may be turned so as to throw the solenoid in direct circuit with line wire, 268, without utilizing wires, 340, and, 341.

Provision is made whereby in case any blast valve fails to close as it should immediately upon the closing of the purge valve (the boiler valve also being closed) an alarm will be given, and the electro-magnets, 125, which effect an operation of the cam shaft and cams will be maintained in a deënergized condition, thus stopping further rotation of the cams. To do this an automatic circuit breaker, 345, is employed which has the form of an electro-magnet and which is so disposed as to coact with the armature, 283, which latter is included in the circuit that causes the cam-shaft or drum magnets, 125, to be energized.

It will be understood that when the purge valve is closed the interlock device, 228 has position to bridge the gap between the interlock contact plates, 231, and if the boiler valve is also closed its interlock device 243, will have the position shown in Fig. 21, whereby to bridge the gap between the interlock plates, 246. If, therefore, while the purge and boiler interlocks are in the closed positions, any one of the blast valves is open, one or the other of the blast valve interlocks, 232, 236, or 240, will also be in the open position shown in Fig. 21, and a blast would take place in either the generator, carbureter or superheater, which is to be avoided, and which will be discovered through the alarm and at the same time the cam or drum shaft will be stopped so that neither oil or steam can be admitted. The circuit through the automatic circuit breaker, 345, to effect the operation just above described will be from battery, 264, by wires, 269, 278, and, 346, to magnet circuit breaker, 345, then by wire, 347, to and through alarm bell, 348; by wire, 349, to and through the contact plates, 231, of the purge interlock which will then be closed by the interlock, 228, from said plates by wire, 350, to and through the contact plates, 246, of the boiler interlock; then by wires, 351, to the interlock plates, 235, of the generator blast interlock; then by wires, 352, and, 353, to wires, 274, and, 275, back to the battery. The circuit just explained only includes the generator blast interlock but a branch, 354, leads to and connects wire, 351, with the interlock contact plates, 241, of the superheater blast while a wire, 353, continues past both the generator and carbureter blast interlocks and also connects with said contacts, 241, and connects with wire, 253, so as to complete the return circuit back to the battery without passing through or including the generator blast contacts, 253. By means of these latter connections the generator blast may be closed and superheater blast stuck whereupon the circuit through the alarm and circuit breaker would nevertheless be completed and the alarm sounded and cam or drum shaft stopped. The carbureter blast contact plates, 239, are also provided with a branch wire, 355, from wire, 351, and with another wire, 356, which connects with the return wire, 353. It will thus be seen that if superheater blast is stuck the circuit will be from wire, 351, by wire, 354, to contacts, 241, then by wire, 353, back to battery; that if the carbureter blast is stuck and left open the circuit will be from wire, 351, by branch, 355, to contacts then by wire, 356, to wire, 353, and back to battery. Thus, no matter which blast may remain open, the alarm will sound and the cam or drum shaft will stop rotation.

The stoppage of the cam or drum shaft is effected at any time the magnet, 345, is energized, because when said magnet is energized the armature, 283, will be lifted from contact point 282, and held in the lifted position, thus breaking the circuit to and through electro-magnets, 125, and preventing the actuation of armature, 127, which drives the cam or drum shaft.

It is deemed advisable to provide an alarm device in connection with the open position contact plates, 252, of the oil interlock, 251, so that in case the oil valve should remain open after the steam valve has closed the alarm will sound. This device includes an alarm, such as a bell, 357, which is connected directly with main line wire, 268, and is provided with a wire, 358, which leads to and is connected to one plate of the oil interlock contacts, 252. If the oil valve remains open the interlock device, 251, will bridge the gap between the two plates, 252, and a wire, 359, leads from the other of these two interlock plates and connects with one of the two interlock plates, 250, of the steam interlock which latter will be closed. A wire, 360, then extends from the other of said steam interlock plates, 250, and connects with wire, 343, so that the return circuit will be from wire, 343, to wires, 303, and, 269, back to battery. It will thus be understood that if the oil valve remains open after the steam valve has closed the circuit for the oil alarm will be completed through the oil and steam interlock plates and the oil alarm will sound.

From the foregoing explanations it is to be understood that all of the valves of the generator are actuated automatically and in proper order, both as to opening and closing; that the interlocking of the various valves is automatically effected; that the failure of current will at once cause an opening of the purge valve and a closing of all air, steam and oil valves; that the failure of any blast valve to close upon the closing of the purge valve will stop the drum and sound alarm and that if the oil valve fails to close upon closing of the steam an alarm will also be given.

The inventive idea here involved may find expression in various mechanical and electrical forms, and I have, for the purpose of illustrating the invention, shown one of such forms in the accompanying drawings, but it is to be distinctly understood that said drawings are intended for the purpose of illustration only and not in any way defining the limits or scope of the invention.

While I have described the mechanism and devices specifically and with minuteness in many instances, it is to be understood that this has been done merely for the sake of clearness, as the principles of the invention are not limited to the specific form, size or arrangement of parts shown.

Having thus described my invention what I claim and desire to secure by Letters Patent is:—

1. The combination with a gas generator having a plurality of valves, of a plurality of power mechanisms for actuating the valves; electrical means for controlling each power mechanism and timing mechanism to control the electrical means.

2. The combination with a gas generator having a plurality of valves, of a plurality of power mechanisms for actuating the valves; electrical means for controlling each power mechanism; timing mechanism to control the electrical means for adjusting the timing mechanism to vary the interval of actuating of the electrical means.

3. The combination with a gas generator having a plurality of valves, of power mechanism for operating the valves; cam mechanism to control the actuation of the power mechanism and electrical means for actuating the cam mechanism.

4. The combination with a gas generator having a plurality of valves, of power mechanism for operating the valves to open and close the latter; cam mechanism to control the operation of the power mechanism and to determine the period of time a valve is to remain open and closed and means for adjusting the cam mechanism whereby to vary the period a valve is to remain open.

5. The combination with a gas generator having a plurality of valves, of a cam mechanism for each valve to cause an opening and closing of the latter at predetermined time intervals; intermittently-moving timing mechanism for actuating the cams and means for varying the intervals of movement of the timing mechanism to vary the cycle period of the cams.

6. The combination with a gas generator having a plurality of valves; of power mechanism for actuating the valves; electrical means to control said power mechanism; cam mechanism to control the electrical means and timing mechanism to control the cycle period of cam operation.

7. The combination with a gas generator having a plurality of valves, of power mechanism for actuating said valves; a cam for each valve of the generator; electrical means controlled by the cams for controlling the power mechanisms and timing mechanism to effect an operation of the cams.

8. The combination with a gas generator having a plurality of valves, of power mechanism for actuating said valves; a cam for each valve of the generator; electrical means controlled by the cams for controlling the power mechanism; timing mechanism and electrical means actuated by the timing mechanism for controlling the cycle period of cam operation.

9. The combination with a gas generator having a plurality of valves, of power mechanism for actuating said valves; a cam for each valve of the generator; electrical means controlled by the cams for controlling the power mechanisms; timing mechanism; electrical means actuated by the timing mechanism for controlling the cycle period of cam operation, means for varying the timing mechanism and means for adjusting the cams to vary the period of time during which the power mechanism shall remain in one position or another.

10. The combination with a gas generator having a plurality of valves, of timing means for automatically actuating said valves at predetermined intervals and electrical means for interlocking the valves.

11. The combination with a gas generator having a plurality of valves, of means for operating the valves at predetermined intervals of time and electrical means for interlocking the valves.

12. The combination with a gas generator having a plurality of valves, of means for automatically actuating the valves at predetermined intervals and electrical means for interlocking the valves.

13. The combination with a gas generator having a plurality of valves, of timing mechanism; means controlled by the timing mechanism for permitting actuation of the valves at predetermined intervals and electrical means for interlocking the valves.

14. The combination with a gas generator having a plurality of valves; means for automatically opening and closing the valves in a predetermined order and electrical means for interlocking the valves.

15. The combination with a gas generator having a plurality of valves, of automatic means for operating the valves to open and close the same at predetermined intervals; means for varying the period during which the valves are to remain open or closed and electrical means for interlocking the valves.

16. The combination with a gas generator having a plurality of valves, of power mechanism for actuating the valves; time-actuating means for controlling the power mechanism and electrical means for interlocking the valves.

17. The combination with a gas generator having a plurality of valves, of a plurality of time-controlled power mechanisms for actuating said valves and means for interlocking the power mechanisms.

18. The combination with a gas generator having a plurality of valves, of a plurality of power mechanisms for actuating said valves; time actuated means for controlling the power mechanisms and means for interlocking the power mechanism.

19. The combination with a gas generator having a plurality of valves, of a plurality of power mechanisms for actuating said valves; time-controlled means for actuating the power mechanisms in a predetermined order and means to interlock one power actuating means with respect to another.

20. The combination with a gas generator having a plurality of valves, of power mechanism for actuating the valves; time-controlled electrical means for controlling the power mechanism and interlocking means to prevent an electrical means operating a power mechanism out of order.

21. The combination with a gas generator having a plurality of valves, valve-actuating mechanism; time-actuated cam mechanism to control the operation of the valve actuating mechanism and means for interlocking the valve actuating mechanism.

22. The combination with a gas generator having a plurality of valves, of valve-actuating mechanism; time-controlled cam mechanism to determine the time of operation of the valve-actuating mechanism; means for adjusting the cam mechanism to vary the time at which the valve-actuating mechanism shall operate and interlocking means to prevent the movement of some of the valve-actuating mechanisms while others are in the operated position.

23. The combination with a gas generator having a purge valve and an oil valve, of time-controlled means for automatically operating said valves and means for interlocking said valves.

24. The combination with a gas generator having a purge valve, an oil valve and a steam valve, of time-controlled means for automatically operating said valves and means for interlocking said purge oil and steam valves.

25. The combination with a gas generator having a purge valve, an air blast valve and an oil valve, of time-controlled means for automatically operating said valves, and means for interlocking the air blast and oil valves.

26. The combination with a gas generator having a purge valve, an air blast valve and an oil valve, of actuating means for each valve; an interlock device for each valve-actuating means and time-controlled means for automatically operating the several valve-actuating means and effecting an automatic operation of the interlocking devices whereby to prevent the opening of the oil valve while either the blast or purge valves are open.

27. The combination with a gas generator having a valve controlling an escape toward the atmosphere and also having an air-blast valve, of time-controlled means for automatically operating said valves and automatic means for stopping the operation of the generator upon the failure of the blast valve to close upon the closing of the purge valve.

28. The combination with a gas generator having a plurality of valves including a purge valve and an air-blast valve, of time-controlled cam means for automatically controlling the operation of said purge and blast valves; means for operating the cam means and means for stopping the operation of the cam means on the failure of the air-blast valve to close upon the closing of the purge valve.

29. The combination with a gas generator having a plurality of valves including a valve to control an escape to the atmosphere and an air-blast valve; means for automatically operating the said escape and blast valves; electrical means for controlling said valve-operating means; cam means for controlling said electrical means; time-controlled means to actuate the cams and means for stopping the cams on the failure of the air-blast valve to close upon the closing of the escape valve.

30. The combination with a gas generator having a valve controlling an escape toward the atmosphere and also having an air-blast valve, of means for automatically operating said valves; electrical means controlling the valve-operating means; cams interposed in said electrical means; time-controlled electrical driving means for the cams; a circuit breaker included in the said electrical driving means and means for operating the circuit breaker to stop the driving means and cams upon the blast valve remaining open after the escape valve closes.

31. The combination with a gas generator having a plurality of valves including an oil valve and a steam valve, of time-controlled means for automatically operating said oil and steam valves; an alarm, and means for sounding the alarm upon the closing of the steam valve and the oil valve remaining open.

32. The combination with a gas generator having a plurality of valves, of means for automatically operating said valves, timing mechanism for determining the cycle of operation; means for adjusting the timing means to vary the cycle of operation and electric means for actuating said timing mechanism.

33. The combination with a gas generator having a plurality of valves, of means for automatically operating said valves; a timing pendulum for determining the cycle of operation; electrical means for actuating the pendulum and means operated at each beat of the pendulum for automatically controlling the actuation of the valve-operating means.

34. The combination with a gas generator having a plurality of valves, of means for actuating said valves; a timing mechanism for determining the cycle of operation; electrical means for actuating the timing means; electrical devices for controlling the operation of the valve actuating means; cams for determining the time period in each cycle during which the valves shall be in the open and closed positions and electrical means for actuating the cams.

35. The combination with a gas generator having a purge valve, a generator blast valve, a carbureter blast valve, a superheater blast valve, a steam valve and an oil valve, a plurality of power mechanisms for actuating said valves at predetermined time periods irrespective of their location in the generator apparatus and electrical means for automatically controlling said power mechanisms.

36. The combination with a gas generator having a purge valve, a generator blast valve, a carbureter blast valve, a superheater blast valve, a steam valve and an oil valve, of separate power mechanisms for automatically actuating said valves at predetermined time periods and electrical means for automatically interlocking said valves.

37. The combination with a gas generator having a purge valve, a generator blast valve, a carbureter blast valve, a superheater blast valve, a steam valve and an oil valve, of separate power mechanisms for actuating said valves at predetermined time periods; mechanism to control the power mechanism and electrical interlocking means for said valves.

38. The combination with a gas generator having a purge valve, a generator blast valve, a carbureter blast valve, a superheater blast valve, a steam and an oil valve, of power mechanism for operating said valves; time-controlled adjustable cam mechanism to control the actuation of the power mechanism and interlocking means for said valves.

39. The combination with a gas generator having a purge valve, a generator blast valve, a carbureter blast valve, a superheater blast valve, a steam valve and an oil valve, of time controlled power mechanism to actuate said valves; electrical means to cause the power mechanism of the purge valve to hold said purge valve closed and electrical means to cause the power mechanisms of all the other valves to hold said latter valves open.

40. The combination with a gas generator having a plurality of valves, of a plurality of separate power means for automatically actuating said valves and electrical interlocking means for said valves.

41. The combination with a gas generator having a plurality of valves, of power means for automatically actuating said valves; electrical means for actuating the power means at predetermined time periods and electrical interlocking means to prevent actuation of a power means out of order.

In testimony whereof I affix my signature in presence of two witnesses.

JOHN C. SHAW.

Witnesses:
CHARLES B. MANN, Jr.,
JOHN W. HEWES.

Copies of this patent may be obtained for five cents each, by addressing the "Commissioner of Patents, Washington, D. C."